USO10418927B2

(12) United States Patent
Calverley et al.

(10) Patent No.: US 10,418,927 B2
(45) Date of Patent: Sep. 17, 2019

(54) MAGNETIC GEAR SYSTEM AND METHOD FOR REDUCING TRANSMISSION OF TORQUE PULSATION

(71) Applicant: Magnomatics Limited, Yorkshire (GB)

(72) Inventors: Stuart Calverley, Yorkshire (GB); Jeff Birchall, Yorkshire (GB)

(73) Assignee: Magnomatics Limited, Yorkshire (GB)

( * ) Notice: Subject to any disclaimer, the term of this patent is extended or adjusted under 35 U.S.C. 154(b) by 174 days.

(21) Appl. No.: 15/117,979

(22) PCT Filed: Feb. 11, 2015

(86) PCT No.: PCT/GB2015/050382
§ 371 (c)(1),
(2) Date: Aug. 10, 2016

(87) PCT Pub. No.: WO2015/121647
PCT Pub. Date: Aug. 20, 2015

(65) Prior Publication Data
US 2016/0359441 A1 Dec. 8, 2016

(30) Foreign Application Priority Data

Feb. 11, 2014 (GB) .................................. 1402334.5
Jun. 5, 2014 (GB) .................................. 1410035.8

(51) Int. Cl.
*H02P 17/00* (2006.01)
*H02K 49/10* (2006.01)
(Continued)

(52) U.S. Cl.
CPC ................ *H02P 17/00* (2013.01); *H02K 7/11* (2013.01); *H02K 49/102* (2013.01); *H02P 6/00* (2013.01); *H02P 6/32* (2016.02)

(58) Field of Classification Search
CPC ......... H02P 6/00; H02P 17/00; H02K 49/102; H02K 7/11
(Continued)

(56) References Cited

U.S. PATENT DOCUMENTS

2007/0125578 A1 6/2007 McDonald et al.
2010/0052323 A1 3/2010 Vyas et al.
(Continued)

FOREIGN PATENT DOCUMENTS

CN 1910065 A 2/2007
CN 202334126 U 7/2012
(Continued)

OTHER PUBLICATIONS

Translation of foreign patent document JP 2010089747 A (Year: 2010).*

(Continued)

*Primary Examiner* — Alex W Mok
(74) *Attorney, Agent, or Firm* — Lee & Hayes, P.C.

(57) ABSTRACT

A system comprises an input member, an output member, a magnetic gear connecting the input member to the output member and control means arranged to control the flow of power from the input member to the output member. The magnetic gear comprises a first set of magnetic poles, a second set of magnetic poles, and a set of pole pieces arranged to modulate the magnetic field between the first set of magnetic poles and the second set of magnetic poles. The control means comprises means for reducing the transmission of torque pulsation and/or oscillation from the input member to the output member.

20 Claims, 15 Drawing Sheets

(51) Int. Cl.
*H02P 6/32* (2016.01)
*H02P 6/00* (2016.01)
*H02K 7/11* (2006.01)

(58) Field of Classification Search
USPC .......................................................... 310/103
See application file for complete search history.

(56) References Cited

U.S. PATENT DOCUMENTS

| | | | |
|---|---|---|---|
| 2011/0037333 A1 | 2/2011 | Atallah et al. | |
| 2011/0042965 A1 | 2/2011 | Atallah et al. | |
| 2011/0260564 A1* | 10/2011 | Rodger | H02K 7/06 310/83 |
| 2012/0091847 A1* | 4/2012 | Fullerton | H02K 21/24 310/156.35 |
| 2012/0094555 A1* | 4/2012 | Calverley | B63H 23/24 440/6 |
| 2012/0098374 A1 | 4/2012 | Curbelo et al. | |
| 2012/0119509 A1* | 5/2012 | West | F02B 37/00 290/1 C |
| 2013/0221778 A1 | 8/2013 | Kusase | |
| 2013/0234553 A1 | 9/2013 | Kusase et al. | |

FOREIGN PATENT DOCUMENTS

| | | | |
|---|---|---|---|
| EP | 1936238 A2 | 6/2008 | |
| GB | 2437568 A | 10/2007 | |
| GB | 2457682 A | 8/2009 | |
| GB | 2468888 A | 9/2010 | |
| JP | 2010089747 A | 4/2010 | |
| JP | 2012205348 A | 10/2012 | |
| JP | 2013179806 A * | 9/2013 | ............ H02K 16/02 |
| WO | WO2005080111 A1 | 9/2005 | |
| WO | 2009103994 A2 | 8/2009 | |
| WO | WO-2010082893 A1 * | 7/2010 | ............ F02B 37/00 |
| WO | 2011036552 A1 | 3/2011 | |
| WO | 2011088944 A1 | 7/2011 | |
| WO | 2012060931 A1 | 5/2012 | |
| WO | 2013001557 A1 | 2/2015 | |

OTHER PUBLICATIONS

Authorized Officer: Anton Roider, "International Search Report" issued in counterpart PCT Patent Application No. PCT/GB2015/050382, dated Jul. 10, 2015, Publisher: PCT.
"Search Report" issued in counterpart GB Patent Application No. GB1402334.5, dated Jan. 29, 2015, Published in: GB.
Dave Latimer, "MAGSPLIT—a magnetic CVT", "The Newsletter SMMT Innovation and Technology", dated Spring 2014, pp. 1-4, Publisher: The Society of Manufacturers and Traders Limited, Published in: GB.
First Chinese Office Action dated May 22, 2018 for Chinese patent application No. 201580008263.X, a counterpart foreign application of U.S. Appl. No. 15/117,979, 13 pages.
European Office Action "Communication pursuant to Article 94(3) EPC," dated Nov. 16, 2018 for European patent application No. 15705061.8, a counterpart foreign application of U.S. Appl. No. 15/117,979, 4 pages.
Japanese Office Action dated Jan. 8, 2019 for Japan patent application No. 2016-549566, a counterpart foreign application of US patent publication No. US2013/221778, 9 pages.

* cited by examiner

MAGNETIC GEAR SYSTEM AND METHOD FOR REDUCING TRANSMISSION OF TORQUE PULSATION

CROSS REFERENCE TO RELATED APPLICATIONS

This application is a national phase of PCT International Application No. PCT/GB2015/050382, filed Feb. 11, 2015, which claims priority to GB patent application No. 1402334.5, filed Feb. 11, 2014 and GB patent application No. 1410035.8, filed Jun. 5, 2014, all of which are incorporated herein by reference.

FIELD

This disclosure relates to systems and methods in which a magnetic gear is arranged and/or controlled to reduce the transmission of torque pulsations from, for example, an internal combustion engine to other components of a vehicle.

BACKGROUND

It is a requirement in all vehicles to match variable road load demands, such as speed and torque, to the output of the engine. The engine operating profile has areas of greater and lower efficiency and a given power level (which is the product of torque and speed) can be delivered with a number of different combinations of engine torque and speed that can give greater or lower efficiency and hence greater or lower fuel consumption and emissions. This has historically been achieved in two ways: either with a discrete number of gears, engaged manually by driver or automatically by a control mechanism; or with a continuously variable transmission (CVT) system employing mechanical elements such as cone-drive systems. The latter does not have fixed steps in gearing.

One of the ways that electric hybrid vehicles aim to increase fuel efficiency and lower emissions is to use a combination of energy sources (i.e. battery and fuel tank) and a combination of electrical and mechanical drives to ensure that the primary engine is operated at the most appropriate torque/speed combination. Any surplus/deficit in power is then addressed with an electrical powertrain (energy storage, inverters and motors). One of the elegant ways this can be achieved is to use a "power-split" in what has become known as a "blended" electric hybrid as shown in FIG. 1. The power-split element 11 is a planetary gear 12 combined with a motor/generator 13. The motor/generator is used to control the rotation of an inner sun gear to vary the gear ratio of the planetary gear, while the engine 14 output and output to final drive are connected to the ring and planet carrier.

It should be well understood that a planetary gear has three elements. If any one of these elements is held static there is a fixed gear ratio between the other two elements and 3 different ratios can be achieved in any gear. By allowing the third element to rotate the ratio between the other two rotors will be varied.

By rotating and reacting torque on the sun gear the motor/generator imports or exports electrical power from the mechanical power train. For example, when there is a surplus of engine power above the required road load, power is extracted electrically and stored in the energy storage system 15, via an inverter 17. This energy may then be used at some later time either by the power-split motor returning power through the inverter 17 and through the power split system, or via a second inverter 18 and a secondary traction motor 16 driving the wheels. Therefore a "variator" path has been provided that allows engine power to reach the wheels through different paths and engine power requirement is to some extent decoupled from required road power.

These power-split systems can effectively give infinitely variable control of gear ratio, and can de-clutch engine to a point where engine has finite speed and the wheels have zero speed. This function has traditionally been achieved by the use of a disengaging clutch which itself is coupled to an inertial flywheel (on the ICE crank) which is also used to filter out torque pulsations from reciprocating engine. However, the flywheel reduces vehicle dynamic performance due to the added inertia. This clutch and flywheel may now be removed from the system and the engine crank would now be directly coupled to the power train through the power split device.

However, elimination of the clutch and adoption of direct coupling between engine and drivetrain leads to a more direct transmission of engine torque pulsations which would normally be largely attenuated by the clutch (through slipping/micro-movement) and inertial flywheel. This has impact on NVH (Noise, Vibration and Harshness) and hence "driver-feel" and wear on driveline components. This issue has been addressed with the use of Dual Mass Flywheels (DMFs).

Dual mass flywheels (DMFs) are usually fitted to diesel engine vehicles as they eliminate excessive transmission noise, protect the gearbox from damage and reduce gear change/shift effort. In a DMF, the mass of the conventional flywheel is split into two. One part is added to the engine's moment of inertia, while the other part increases the moment of inertia of the transmission. The two decoupled masses are linked by a spring/damping system and the DMF acts as a damper between the crankshaft and the input shaft on the gearbox. It also has a set of springs inserted between two rotating masses; the slip is cushioned by a set of torsional springs that smooth out irregular torque pulses from the engine. The springs are sized to absorb resonant vibration from the engine under load conditions.

This device introduces added cost and complexity to the drive train and has a number of wearing parts. Replacement is complex and costly due to its location between the engine and transmission.

Further, the above mechanical system suffers from a fundamental limitation of mechanical gears. The planetary gear must follow the big-wheel/small-wheel principle and the lowest torque, highest speed element is always the inner-most sun gear (while the ring gear and planet carrier are high-torque low-speed elements). It is advantageous to allow the mechanical power flow to be carried on the highest torque outer elements and drive the lowest torque highest speed element with the motor generator (as this will reduce the electrical machine size and increase its efficiency).

However, this leads to a complex shaft arrangement as access to the inner most gear is required, within the confines of two coaxial drive shafts.

A solution to these problems is desirable.

SUMMARY

Thus, this disclosure relates to three-rotor magnetic power-split and two-rotor magnetic power-split concepts, for use in, for example, an automotive powertrain. In particular it covers how the characteristics of the magnetic gear elements can be used to delete a dual mass flywheel from the vehicle powertrain (with simplification and cost benefits) while meeting the required NVH (noise, vibration and harshness) specifications. The system can be extended to allow for active cancellation and/or filtering of engine torque pulsations.

In general terms, embodiments of this disclosure provide a system comprising a magnetic gear in which a rotating set of poles, which may be considered a "virtual" rotor or may instead be a physical rotor for example carrying permanent magnets, is coupled with windings to rotate in response to a current in those windings or to rotate and induce a current in those windings. The two other rotors of the gear, one of which carries magnetic poles and the other a set of pole pieces, are coupled to an input member and an output member (one is coupled to each). The system is arranged to operate the windings in a manner that will not allow pulsation torque to be transmitted (through reaction) from the input member to the output member, for example by maintaining an essentially constant reaction torque in the stator. The torque pulsation may, for example, be due to individual combustion events in an internal combustion engine to which the input member is coupled. In this way, embodiments are able to reduce—when compared to alternative arrangements—the transmission of torque pulsations from an engine through the drivetrain of a vehicle. Thus, the refinement of the vehicle may be improved without the need for expensive and complicated components such as a dual-mass flywheel (DMF). Or a DMF may be retained and refinement further improved using the present embodiments.

According to one aspect of this invention, there is provided a system comprising an input member, an output member, a magnetic gear connecting the input member to the output member and control means arranged to control the flow of power from the input member to the output member wherein the magnetic gear comprises a first set of magnetic poles, a second set of magnetic poles, and a set of pole pieces arranged to modulate the magnetic field between the first set of magnetic poles and the second set of magnetic poles and wherein the system further comprises means for reducing the transmission of torque pulsation and/or oscillation from the input member to the output member.

Optionally, the first set of magnetic poles comprises a first set of permanent magnets.

Optionally, the first set of magnetic poles is associated with a first moveable element.

Optionally, the set of pole pieces is associated with a second moveable element.

Optionally, the first moveable element is connected to the input member.

Optionally, the first moveable element is connected to the output member.

Optionally, the second moveable element is connected to the input member.

Optionally, the second moveable element is connected to the output member.

Optionally, the second set of magnetic poles is a consequent set of magnetic poles generated by the interaction between the first set of magnetic poles and the poles pieces. There may be a magnetic field produced by windings that interacts with the consequent magnetic field.

Optionally, the windings are mounted on a stator.

Optionally, the windings are controlled by the control means.

Optionally, the second set of magnet poles comprises a second set of permanent magnets.

Optionally, the second set of permanent magnets is mounted on a third moveable element of the magnetic gear.

Optionally, the control means is arranged to control movement of the third moveable element. This may be by operating the windings and the third moveable element as the stator and rotor, respectively, of a motor-generator.

Optionally, the system further comprises an energy storage system, wherein the control means is configured to control the flow of power from the input member to the energy storage system or from the energy storage system to the output member if a required power at the output member is different from a power at the input member.

The input member may be coupled to the crankshaft of an internal combustion engine. The torque pulsation and/or oscillation may be that due to individual combustion events of the engine. The torque pulsation and/or oscillation may have a frequency of more than one cycle per revolution of the input member. The torque pulsation and/or oscillation may have a frequency of between 10 Hz and 300 Hz.

According to a second aspect of this invention, there is provided a system comprising an input member, an output member, an energy supply means, an energy sink means and a magnetic gear connecting the input member to the output member, wherein the magnetic gear comprises a set of permanent magnets, a set of windings, and a set of pole pieces arranged to modulate the magnetic field between the set of permanent magnets and the set of windings; the system further comprising control means arranged to control the current in the windings, and thereby control the flow of power from the input member to the energy sink means or from the energy supply means to the output member if a required power at the output member is different from a power at the input member, wherein the system further comprises means for reducing the transmission of torque pulsation and/or oscillation from the input member to the output member.

In the second aspect, the set of permanent magnets is optionally mounted on a rotor associated with one of the input member and the output member and the set of pole pieces is mounted on a rotor associated with the other of the input member and the output member.

In the second aspect, the control means are optionally configured to control the current in the windings such that the magnetic field produced by the windings interacts with a consequent magnetic field generated by modulation by the set of pole pieces of a magnetic field produced by the set of permanent magnets.

In the second aspect, the control means are optionally configured to control the current in the windings such that the magnetic field produced by the windings rotates.

In the second aspect, the control means is optionally configured to vary the amplitude of the current in the windings to produce a required torque.

Optionally, in the system of the second aspect, the energy supply means and the energy sink means comprise an energy storage system.

In the second aspect, the energy sink means optionally comprises a consumer of electrical power.

In the second aspect, the energy sink means optionally comprises a traction motor.

In the second aspect, the energy sink means optionally comprises a hotel load of a vehicle.

The following optional features relate to the system of both the first aspect and the system of the second aspect and are optional features of each.

Optionally, the means for reducing the transmission of torque pulsation and/or oscillation comprises damping means.

Optionally, the damping means comprises a damper bar.

Optionally, the damping means comprises a damper winding.

Optionally, the control means comprises the means for reducing the transmission of torque pulsation and/or oscillation, the control means being configured to apply cancellation torque.

Optionally, the cancellation torque is applied in response to measurements of position, velocity or acceleration of the input member.

Optionally, the cancellation torque is determined using predictions of input member torque pulsations.

Optionally, the predictions of input member torque pulsations are calculated using geometry and combustion parameters of an engine connected to the input member.

Optionally, the means for reducing the transmission of torque pulsation and/or oscillation comprises a cantilevered open-cup rotor on which the set of pole pieces is mounted.

Optionally, the cantilevered open-cup rotor is reverse skewed when unloaded.

Optionally, the cantilevered open-cup rotor is untwisted under load torque.

Optionally, the means for reducing the transmission of torque pulsation and/or oscillation comprises a pole piece support structure formed from compliant material.

Optionally, the compliant material is a composite or engineering plastic.

Optionally, the input member is connected to an engine.

Optionally, the system forms part of a vehicle drivetrain.

Optionally, the energy storage system is a battery.

According to a third aspect of this invention, there is provided a system comprising an input member, an output member, a magnetic gear connecting the input member to the output member and control means arranged to control the flow of power from the input member to the output member wherein the magnetic gear comprises a first set of magnetic poles, a second set of magnetic poles, and a set of pole pieces arranged to modulate the magnetic field between the first set of magnetic poles and the second set of magnetic poles and wherein a number of magnetic poles in the first and second sets of magnetic poles, a number of pole pieces in the set of pole pieces and inertias of moveable elements in the magnetic gear are selected to attenuate torque pulsation and/or oscillation in a bandwidth of frequencies.

According to a fourth aspect of this invention, there is provided a method of controlling a system according to the first aspect or the second aspect, wherein the control means comprises the means for reducing the transmission of torque pulsation and/or oscillation, the method comprising the step of the control means operating to apply cancellation torque.

The cancellation torque may be applied to at least partly cancel the transmission of the torque pulsation and/or oscillation from the input member to the output member.

[Method Claims to, for Example, Two-Rotor Versions]

According to a fifth aspect of this invention, there is provided a method of operating a system as defined in the first aspect and wherein the second set of magnetic poles is produced by a set of windings mounted on a stator of the magnetic gear, current in the windings controllable by the control means, the method comprising the control means:
(a) receiving a first signal indicative of the speed of the input member;
(b) receiving a second signal indicative of a desired speed of the output member;
(c) based on the first signal and the second signal, identifying a value for the current in the windings to give the desired speed of the output member; and
(d) controlling the current in the windings to be substantially constant at that the value, irrespective of cyclic variation in the speed and torque of the input member.

The value for the current may be the magnitude and/or frequency of the current. Similarly, step (d) may comprise controlling the current in the windings to be substantially constant in magnitude and frequency.

The current may be controlled to be substantially constant irrespective of cyclic variation in the speed and torque of the input member due to individual combustion events in an internal combustion engine to which the input member is coupled. The cyclic variation may be variation in the speed and torque of the input member over a revolution of the input member.

The speed of the input member may be the rotational speed. The first signal may also be indicative of the rotational position of the input member. The first signal may be indicative of the average rotational speed of the input member, for example, over one or at least one revolution.

Step (d) may comprise keeping the current substantially constant for as long as the first signal and the second signal are substantially constant. Step (c) may comprise consulting a record indicative of relationships between at least (i) the speed of the input member, (ii) the desired speed of the output member and (iii) the current in the windings that corresponds to (i) and (ii). The current in the windings may be used to estimate torque. The method may also comprise receiving a signal indicative of the torque of the input member. This torque may also be used in step (c) as the basis for identifying the current. This torque may also form part of the relationship recorded in the record. The record may be a look-up table, for example a map.

[Method Claims to, for Example, Three-Rotor Versions]

According to a sixth aspect of this invention, there is provided a method of operating a system as defined in the first aspect and wherein the second set of magnet poles comprises a second set of permanent magnets mounted on a third moveable element of the magnetic gear, the third moveable element being the rotor of a motor-generator having a set of windings in which current is controllable by the control means, the method comprising the control means:
(a) receiving a first signal indicative of the speed and position of the input member;
(b) receiving a second signal indicative of a desired speed of the output member;
(c) based on the first signal and the second signal, identifying a target current to be established in the windings, the target current comprising a cyclically varying correction current to accelerate and decelerate the third moveable element to at least reduce the transmission of cyclic variation in the speed and torque of the input member to the output member; and
(d) controlling the current in the windings to be substantially as the target current.

The method may include the control means receiving an indication of engine torque, for example in the form of an indication of throttle position. It will be appreciated that this is an indication as to size of subsequent torque pulses. The method may comprise using the indication of engine torque in step (c) to identify the target current.

The cyclic variation may be variation in the speed and torque of the input member over a revolution of the input member.

The cyclic variation in the speed and torque of the input member may be due to individual combustion events in an internal combustion engine to which the input member is coupled. The cyclic variation may be variation in the speed and torque of the input member over a revolution of the input member.

The speed of the input member may be the rotational speed. The first signal may also be indicative of the rotational position of the input member. The first signal may be indicative of the average rotational speed of the input member, for example, over one or at least one revolution. Step (d) may comprise maintaining the target current for as long as the average rotational speed of the input member, for at least over one or at least one revolution, and the second signal are substantially constant. Step (c) may comprise consulting a record indicative of relationships between at least (i) the speed of the input member, (ii) the desired speed of the output member and (iii) the current in the windings that corresponds to (i) and (ii). Step (c) may comprise using the information indicative of the rotational position of the input member and/or the information indicative of its rotational speed to give the frequency of the correction current. The method may also comprise receiving a signal indicative of the torque of the input member. This torque may also be used in step (c) as the basis for identifying the current. This torque may also form part of the relationship recorded in the record. The record may be a look-up table, for example a map.

It is envisaged that optional features of any system aspect of this invention also be optional features of any method aspect of this invention, and vice versa.

According to a seventh aspect of this invention, there is provided a drivetrain for a vehicle, the drivetrain comprising an internal combustion engine and a system according to any of the first to sixth aspects, a crankshaft of the internal combustion engine coupled to the input member of the system and the output member of the system coupled to drive wheels of the drivetrain.

According to an eighth aspect of this invention, there is provided a vehicle comprising the drivetrain of the seventh aspect.

According to a ninth aspect of this invention, there is provided a computer program product comprising computer executable instructions to cause a computer to carry out the steps of any method defined above.

According to a tenth aspect of this invention, there is provided an electronic control unit for a vehicle drivetrain, the electronic control unit arranged to carry out the steps of any method defined above.

[Powering Ancillary Components]

The following are optional features of the system that is defined hereinabove in any aspect. These features relate to the use of the system to power an ancillary component of device of a vehicle, such as a heating, ventilation and air conditioning compressor.

Optionally, the input member comprises a pulley.

Optionally, the input member comprises an outer rotor of the magnetic gear and the pulley is arranged concentrically about the outer rotor.

Optionally, the input member is driven by a belt. Optionally, the belt is driven by an engine.

Optionally, the output member is connected to an ancillary component or device of a vehicle. Optionally, the output member is connected to a heating, ventilation and air conditioning compressor. Optionally, the output member is connected to a coolant compressor, an oil pump, water pump or an air compressor.

Optionally, the output member comprises a pulley.

Optionally, the output member comprises an outer rotor of the magnetic gear and the pulley is arranged concentrically about the outer rotor.

Optionally, the input member is connected to an engine.

Optionally, the output member drives a belt. Optionally, the belt drives at least one ancillary component or device of a vehicle. Optionally, the belt drives a heating, ventilation and air conditioning compressor. Optionally, the belt drives one or more of a coolant compressor, an oil pump, a water pump or an air compressor.

Optionally, the windings are mounted on an external stator. Optionally, the windings are mounted on an internal stator.

Optionally, the system comprises braking means for applying a braking torque to the output member. Optionally, the braking torque prevents the output member from rotating. Optionally, the braking torque prevents the output member from accelerating.

Optionally, the control means is further configured to control the flow of power from the energy storage system to the input member.

BRIEF DESCRIPTION OF THE DRAWINGS

Specific embodiments will be described below by way of example only and with reference to the accompanying drawings, in which.

DETAILED DESCRIPTION OF EXAMPLE EMBODIMENTS

Description of a Power-Split System Using Magnetic Gearing

By way of background, the following description is provided.

Figure 1:
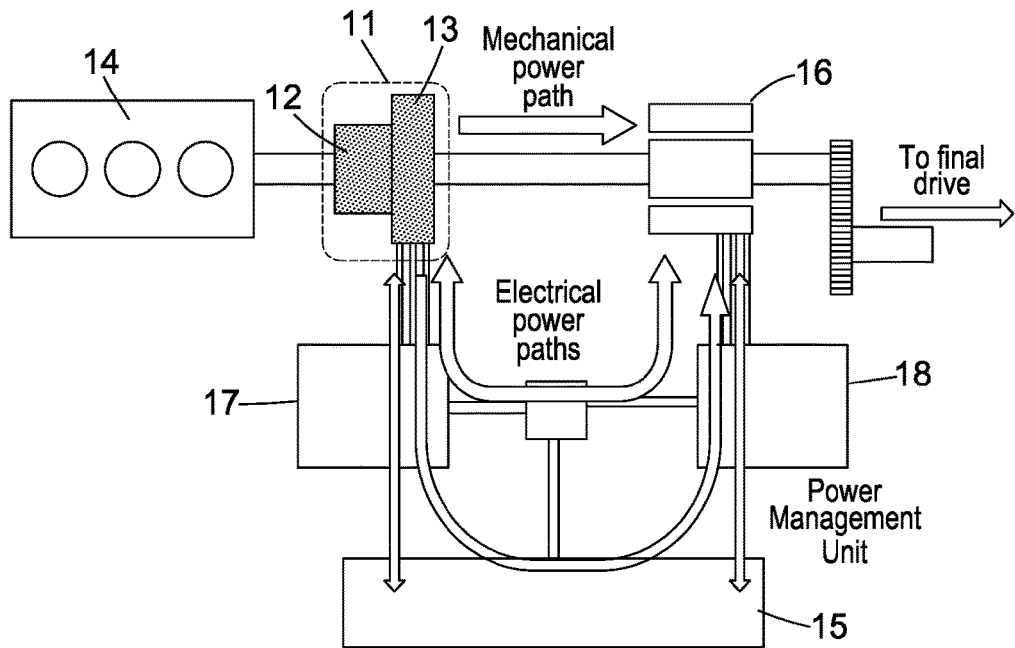
FIG. 1 shows a blended electric hybrid powertrain with power split device.
Figure 2:
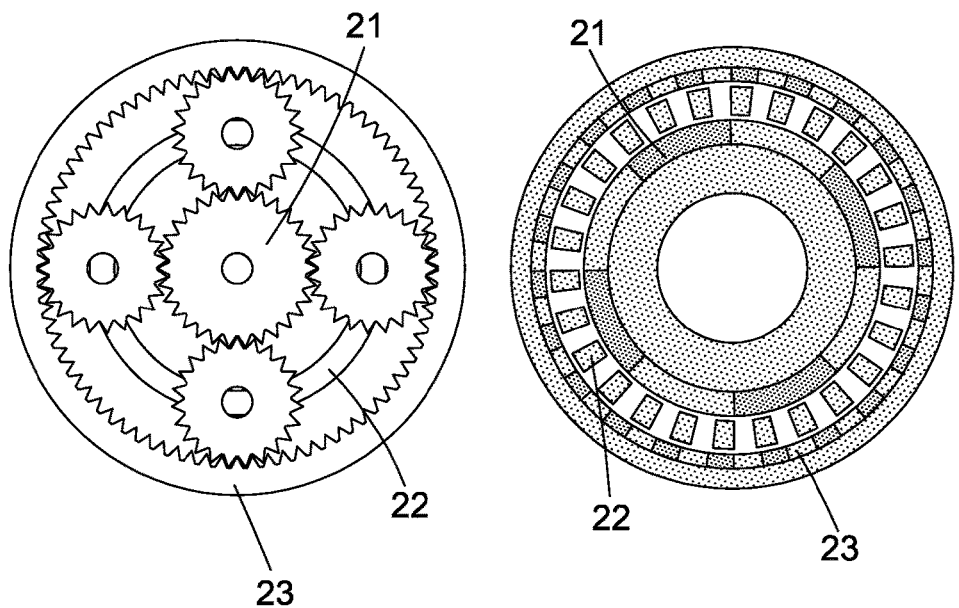
FIG. 2 shows a mechanical planetary gear and an equivalent magnetic gear.

A number of advantages can be obtained by replacing the mechanical planetary gear in the system shown in FIG. 1 with a non-contacting magnetic gear, as shown on the right in FIG. 2 alongside a broadly equivalent mechanical epicyclic gear set. The magnetic gear has a high speed magnet rotor 21 that corresponds to the sun gear of the epicyclic; a steel pole piece rotor 22 that corresponds to the planet carrier; and a low speed magnet rotor 23 that corresponds to the ring gear.

Advantages of the magnetic gear include:

No lubrication required (as no wearing parts, only bearing lubrication required)

High efficiency (as no frictional loss)

No wearing parts increasing reliability (reduced servicing time and lower MTBF)

As will be shown late the magnetic gear maybe inverted (as does not need to follow the big-wheel/small-wheel principle of the mechanical equivalent which allows for a high degree of flexibility.

Additionally, a magnetic gear has inherent torsional compliance between input and output rotor/inertias (through the magnetic field coupling) which will be exploited in this disclosure.

As with the mechanical equivalent, a fixed gear ratio is achieved between two of the rotors by holding the third rotor static. By allowing the third rotor to rotate the speed relationship between the rotors can be altered as discussed below.

Figure 3:
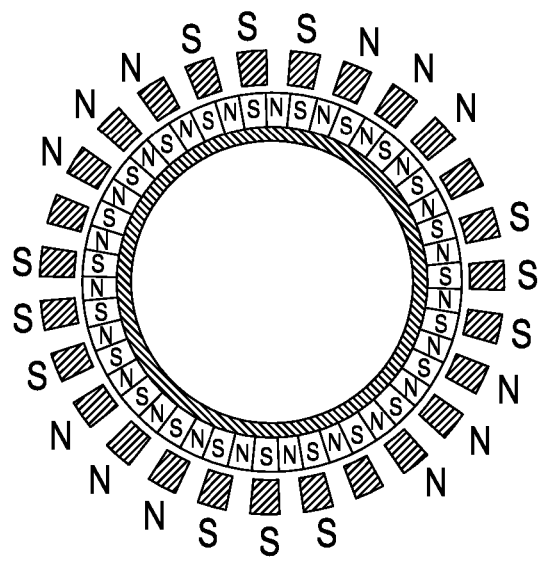
FIG. 3 shows a consequent field generated by modulation of flux from an inner array of permanent magnets by an array of pole-pieces.
Figure 4:
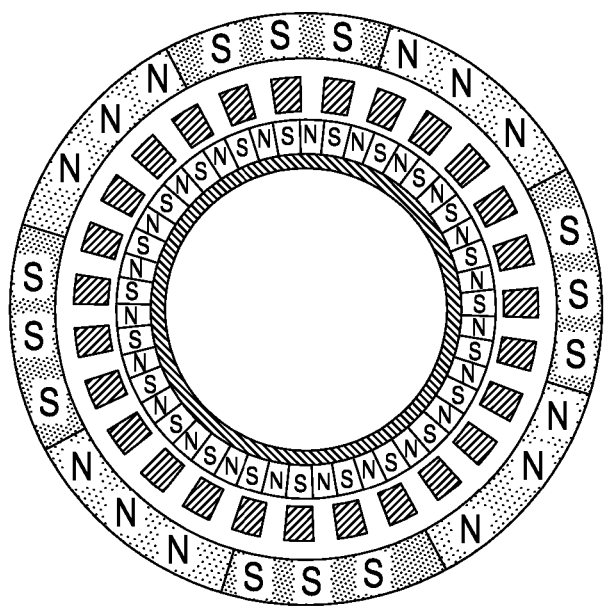
FIG. 4 shows the provision of an external field to interact with a consequent field in a fixed ratio magnetic gear.

For example, an input rotor (driven by the ICE crankshaft) is the intermediate rotor with a number of ferromagnetic pole-pieces which modulate the magnetic field from an second output rotor (connected to the final drive to the wheels) which typically would be a PM array. This creates a consequent modulated magnetic field, as shown in FIG. 3 which has a pole-pair number equal to the number of pole-pieces minus the pole-pair number on the output rotor. In the example shown in the figures, there are 23 pole pairs on the inner PM array and 27 pole-pieces which creates a 4 pole consequent field radially outwards from the pole-pieces. As is consistent with magnetic gear operation, an externally created magnetic field with the same pole-pair number as this "consequent" field will interact/magnetically couple with this consequent field. For example, a 4 pole permanent magnet array is placed outside the modulation rotor as shown in FIG. 4. By interacting the externally created field and the consequent field a torque can be imparted on both the input/pole-piece rotor and the output rotor.

If the externally generated field is held stationary (i.e. it has a series of spatially-disposed poles that are fixed in time and space), then any rotation of the input shaft will cause a geared rotation of the output shaft, as is consistent with any magnetic geared system where the third field (or rotor) is held stationary. This is analogous to a mechanical planetary gear in which the inner sun gear rotates, with the outer ring gear held stationary which causes the planet carrier to rotate, through the planets. The ratio of torques and reciprocal ratio of speeds is fixed and dictated by the ratio of pole-numbers/pole-pieces on the input and output rotor as given in equations [1] and [2] below.

$$\frac{T_{pp}}{T_{op}} = \frac{N_{pp}}{N_{op}} = Gr \qquad [1]$$

$$\frac{\omega_{pp}}{\omega_{op}} = \frac{N_{op}}{N_{pp}} = \frac{1}{Gr} \qquad [2]$$

where, $N_{pp}$ is the number of pole pieces on the input rotor, $N_{op}$ is the number of pole pairs on the output rotor; $T_{pp}$ and $\omega_{pp}$ are the torque and speed of the input rotor respectively and $T_{op}$ and $\omega_{op}$ are the torque and speed of the output rotor respectively. Gr is the gear ratio.

In the above example, the external field (which interacts with the consequent field) is held static to achieve a fixed gear ratio between the input rotor and the output rotor. However, if the outer external field is also allowed to rotate, the speed ratio between the two primary input and output rotors then follows the relationship given in equation [3] where $N_{cr}$ is the number of pole pairs on external source of field and $\omega_{cr}$ is its rotational speed. This field is referred to as the control field. Note, the control field poles are spatially disposed relative to each other as above and it is the entire array of poles rotates.

$$N_{cr}\omega_{cr} = N_{pp}\omega_{pp} - N_{op}\omega_{op} \qquad [3]$$

The speed of the output rotor is then a function of the control rotor given by:

$$\omega_{op} = \frac{N_{pp}\omega_{pp} - N_{cr}\omega_{cr}}{N_{op}} \qquad [4]$$

For example, if $N_{cr}$=8, $N_{pp}$=19, $N_{op}$=11, and $\omega_{pp}$=1300 rpm, then the output rotor is given by $$\omega_{op} = \frac{19 \times 1300 - 8 \times \omega_{cr}}{11} \quad [5]$$

Figure 5:
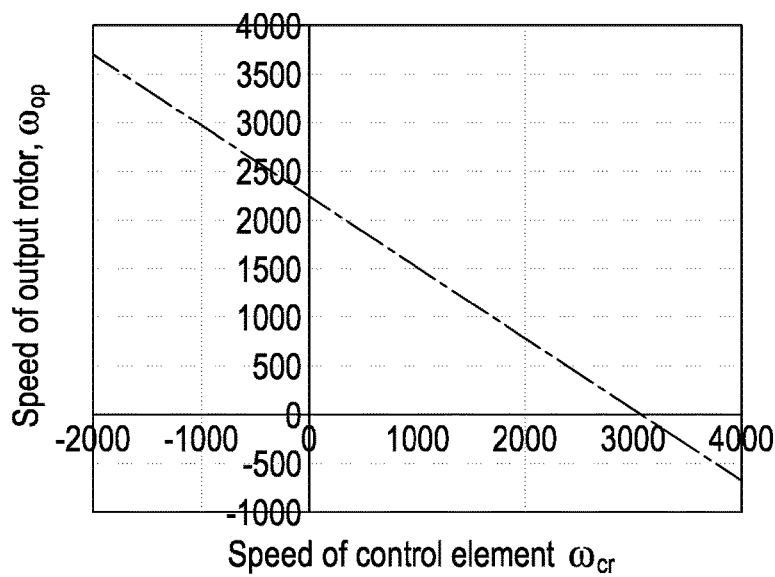
FIG. 5 shows a relationship between output rotor speed and the control element speed for a fixed input speed with the parameters given in the example with a input speed $\omega_{pp}$ of 1300 rpm.
Figure 6:
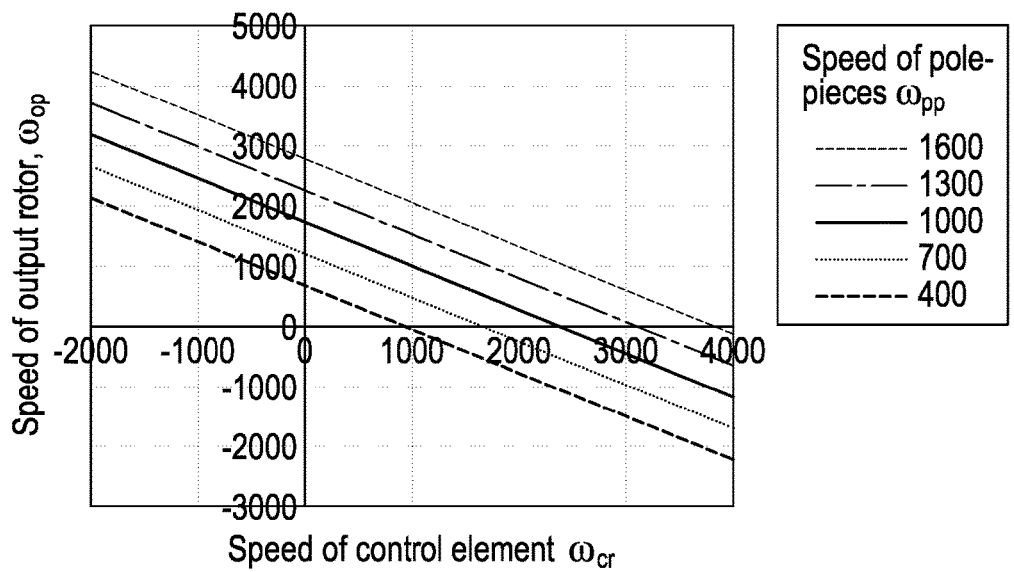
FIG. 6 shows a range of characteristics with different input speeds.

This demonstrates that a variable speed output can be achieved with a fixed input speed. For example, FIG. 5 shows the range of speeds that can be achieved using the parameters given in equation [5], with a fixed input speed of 1300 rpm while varying the control field from −200 rpm to 4000 rpm which demonstrates the ability to increase speed above the quiescent point of 2245 rpm and reduce speed all the way to zero and beyond into reverse. (The quiescent point with $\omega_{cr}$=0 is governed by equation [2] above as $N_{pp}/N_{op}$=19/11=1.727, and 1.727×1300 rpm=2245 rpm). The input speed may also be varied (for example as the engine operating point shifts to higher efficiency operating points across the operating map), and as shown in FIG. 6 a given output speed can be obtained with a continuous range of input and control element speeds.

The above demonstrates how the speed and hence speed gear ratio is controlled. However, the torque ratio remains fixed as proved below. In a lossless system the sum of the powers and torques on all the shafts must add to zero, i.e.

$$P_{cr} + P_{pp} + P_{op} = 0 \quad [6]$$

$$T_{cr} + T_{pp} + T_{op} = 0 \quad [7]$$

Therefore, $$-P_{cr} = P_{pp} + P_{op} \quad [8]$$

As power=speed X torque, from [8]

$$-T_{cr}\omega_{cr} = T_{pp}\omega_{pp} + T_{op}\omega_{op} \quad [9]$$

By inspection of [3] and [9]

$$N_{cr} \propto -T_{cr} \quad [10a]$$

$$N_{pp} \propto -T_{pp} \quad [10b]$$

$$N_{op} \propto -T_{op} \quad [10a]$$

Therefore, $$\frac{N_{cr}}{N_{pp}} = \frac{T_{cr}}{T_{pp}} \quad [11a]$$

$$\frac{N_{pp}}{N_{op}} = \frac{T_{pp}}{T_{op}} \quad [11b]$$

which demonstrates that the ratio of the torques is fixed and is only dictated by the geometry. It is only the speed ratio that changes in response to the change in control field speed.

Note that from equation [3] if $\omega_{cr}$=0

$$N_{pp}\omega_{pp} = N_{op}\omega_{op} \quad [12]$$

Which is the inherent or quiescent gear ratio of the system $$\frac{\omega_{pp}}{\omega_{op}} = \frac{N_{op}}{N_{pp}} \quad [13]$$

Also from [8], if the control field is held static, the power associated with the control rotor is zero, therefore $$P_{pp} = -P_{op} \quad [14]$$

The above demonstrates that that speed ratio can be varied (by controlling the speed of the controlling field) but that the torque ratio is always defined by the ratios of number of pole pairs and pole-pieces and is fixed by the rotor geometries/pole combinations and is selected at the design stage. However, it is important to note that the torque ratio is independent of the rotor diameters. This is a major advantage over mechanical gears which must follow the "big-wheel/small-wheel" principle in which as the gear teeth must have an identical pitch in order to mesh, the only way a gear ratio can be achieved is by having larger and smaller gears/cogs to accommodate the different numbers of teeth. The decoupling of gear ratio from gear diameter in a magnetic gear allows for higher degrees of freedom in design and the ability to ensure appropriate inertias can be employed.

Typical design choices would lead to one rotor having a high torque (i.e. output) and one rotor having a low torque (usually the input) to allow a useful level of gearing/mechanical advantage. The third rotor by virtue of equation [7] has a torque equal to the highest minus the lowest torque and is therefore also a high torque.

The above equations can also be used to prove that as $N_{pp}$ is largest number in the system ($N_{pp}=N_{op}+N_{cr}$), and therefore that this rotor bears the largest torque in system. i.e. the intermediate rotor will always be a high torque element preferably carrying engine or output torque. It is then possible to have the lowest torque rotor in either inner or outer position to this pole-piece rotor. It is advantageous to have through-power (mechanical drive line) using the PPR and the second highest torque rotor, i.e. the one with largest number of pole pairs. This leaves the outer element (which will be used to provide control) to be the lowest torque element. This is advantageous as this element is active with currents and high torques require high currents and hence losses leading to a reduction in efficiency.

This is consistent with the example given above where the consequent field has the lowest pole number (and therefore associated with the lowest torque element in the system) and is used to provide speed control of the two primary rotors, following the maths and graph above.

As with the mechanical power split system described in the introduction, as the control element produces the control field is reacting a torque and is rotating it develops power. If an electrical machine is used to apply the torque and speed control it will be acting as a generator or motor and will export or import power off the mechanical powertrain as electrical energy (through the motor/generators electromechanical energy conversion). This energy is then transiently stored in an energy store (i.e. battery) and/or supplied to consumer of electrical energy such as traction motors providing power to the wheels.

However, providing the external control field to interact with the consequent field and providing a method to control its rotation can be achieved in a more integrated way than in the mechanical prior art, as discussed in the two embodiments described below.

Several embodiments will now be described in which a system comprising a magnetic gear is provided. The magnetic gears are arranged according to the principles set out in the "Description of a power-split system using magnetic gearing" set out above, with this background information being provided to assist the skilled addressee in understanding the present disclosure.

After the following description of alternative systems that may embody the invention, a description follows of methods of operating those systems. It will be understood that those example methods also amount to embodiments.

Embodiment 1

Three Rotor Device

Figure 7:
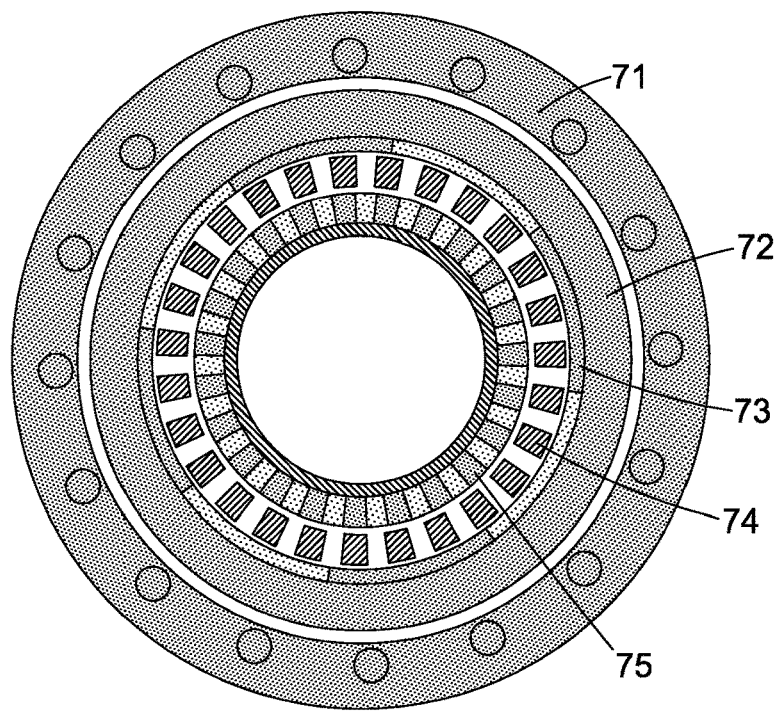
FIG. 7 shows a magnetic gear controlled by a generic outer motor.
Figure 8:
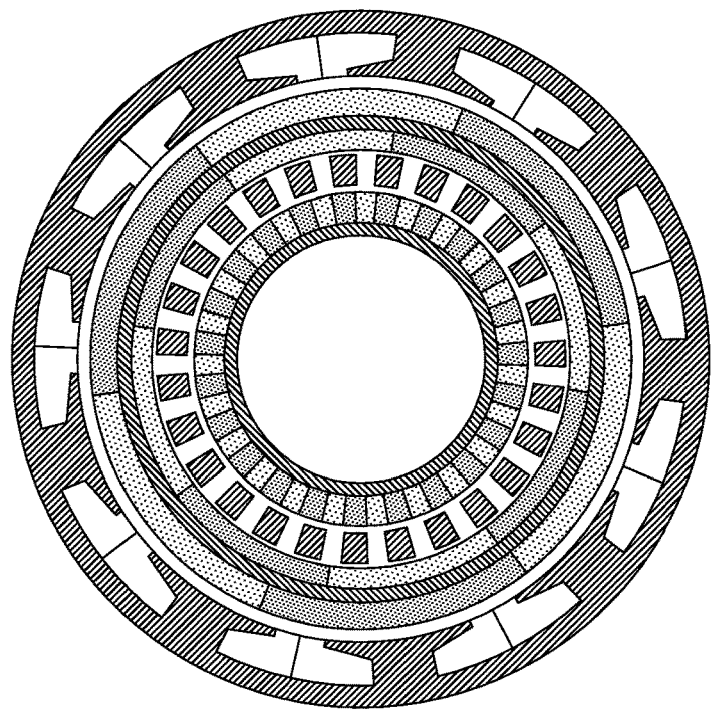
FIG. 8 shows an outer control rotor driven by an outer permanent magnet machine (with a third array of PMs on an outer surface of the rotor)

With reference to FIGS. 7 and 8, in this embodiment, the outer control field which the consequent field interacts with is generated by an array of (permanent magnets) PMs, attached to a rotor. This rotor is rotated by an external means, preferably a stator carrying windings wrapped around the stator and concentric with the gear rotors for packaging benefits as shown in FIG. 7. FIG. 7 shows a motor/generator stator 71 with a winding that acts as a control rotor, a motor/generator rotor 72, a magnetic gear outer PM rotor 73, a pole-piece rotor (input or output) 74 and a magnetic gear PM rotor 75 (input or output).

There are a number of options for this outer control motor. For example:
  A. PM inner and outer—each array has different pole numbers with back iron. This allows independent optimisation of the gear and the motor/generator as shown in FIG. 8
  B. PM inner and outer have same number of poles with back iron back iron is not necessarily required magnetically although it provides support)
  C. As B above but with the back iron now removed. The magnets then can be a single array, with inner surface facing the gear pole-pieces and the outer surface facing the stator. The magnets do not have any structural integrity themselves and are held on a preferably non-magnetic sleeve (i.e. composite of CF tube/sleeve). This has significant advantages in terms of achieving a very low inertia to achieve high dynamics and low loss as it removes sources of iron loss and eddy currents
  D. B above with a buried/interior permanent magnet (IPM) rotor. The magnets are held within a preferably laminated structure. Flux focussing may be used.

Figure 9:
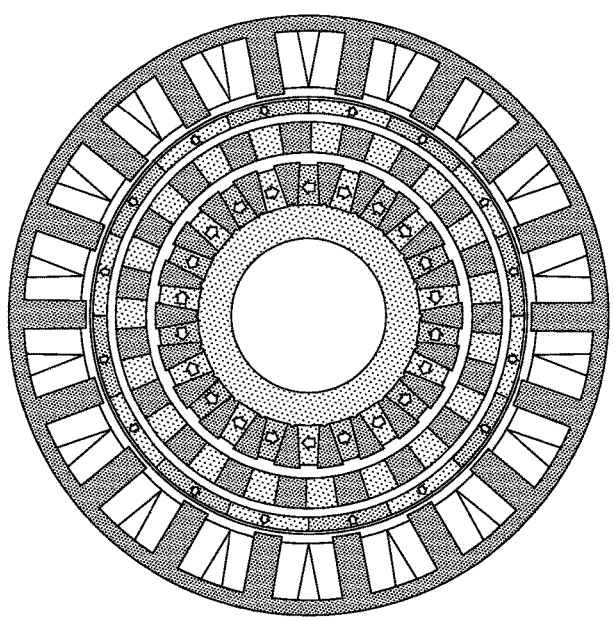
FIG. 9 shows a three-rotor magnetic power split with low inertia control rotor with single array of PMs employed as both a magnetic gear outer rotor and a PM rotor for an outer control stator.

Typically a PM rotor for a motor or generator is created by mounting magnets onto a laminated or solid steel structure in order to provide mechanical strength (as it carries the load torques) and to provide a return path for magnetic flux. If the magnetic pole number on the inner and outer surfaces are identical (i.e. the magnetic gear outer rotor and the outer control machine rotor have the same pole number) this "back-iron" is no longer required and can be omitted magnetically. Variant C above in which the control rotor is a single array of permanent magnets supported on a non-magnetic structure (for example on a composite or CF tube) can have significant operation advantages in that the control rotor is now a low inertia element and allows the system to respond rapidly. An example of this is shown in FIG. 9.

Figure 10A:
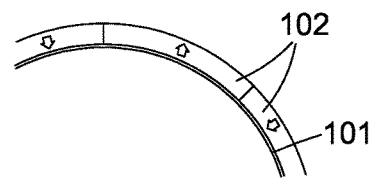
FIG. 10 shows low inertia control rotors for a three-rotor system.
Figure 10B:
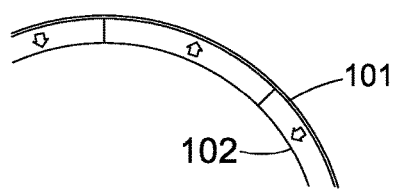
Figure 10C:
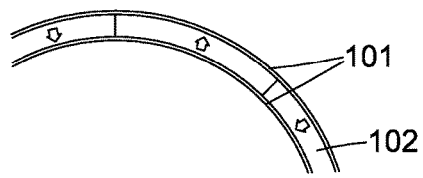

However, as the permanent magnets themselves are brittle and have low structural strength they still require a support structure. FIG. 10 shows possible arrangements of low inertia control rotors. The supporting composite tube could be manufactured from a glass fibre or carbon fibre tube. The examples in FIGS. 10 *a*) and *b*) might be a pre-wound/pre-formed CF tube 101 onto which the magnets 102 are bonded on the inner or outer surfaces. The example in FIG. 10 *c*) may be manufactured for example by bonding magnets onto a pre-formed tube and then overwrapping (wet-winding) a layer of CF/GF with resin and curing. Alternatively a pre-wound tube may be pushed over the inner tube and magnet assembly. A further way to realise such a structure is to form the rotor using a resin transfer mould process (RTM) in which the magnets and layers of CF/GF matting are clamped and held in a mold cavity and low viscosity resin/epoxy is injected under pressure before curing with heat to produce a highly integral part. Alternatively, the support tube may be pre-formed sing RTM techniques and the magnets attached/inserted afterwards. FIG. 9 also shows a further variant of the inner PM array in that the magnetic poles are created through circumferentially aligned magnets focussing flux into pole pieces.

Alternatively, the control rotor may be driven by a different machine technology such as:
  E. Induction machine cage outer (control rotor would have an PM array on one side and an induction machine cage (wound field or solid bars) rotor
  F. Switched reluctance
  G. Wound field synchronous The above may have benefits in terms of reducing required permanent magnet material but will not have as high a torque density/efficiency.

Figure 11:
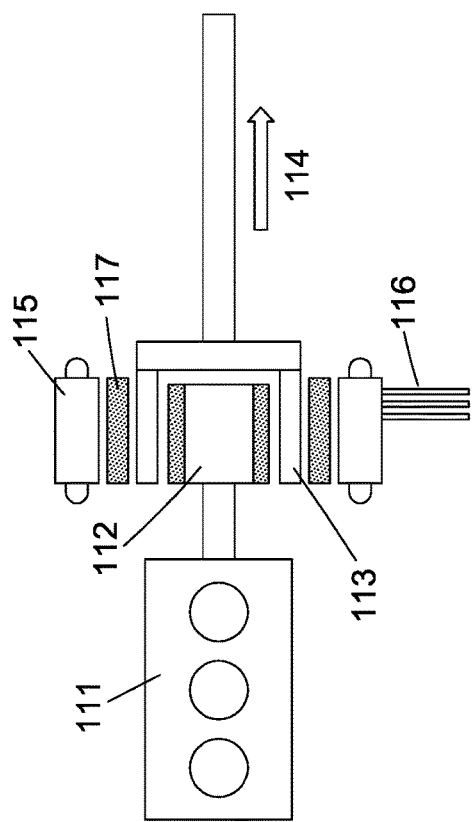
FIG. 11 shows a hybrid power split with PM control rotor and outer stator, shown in two possible combinations of input and output shaft.
Figure 11:
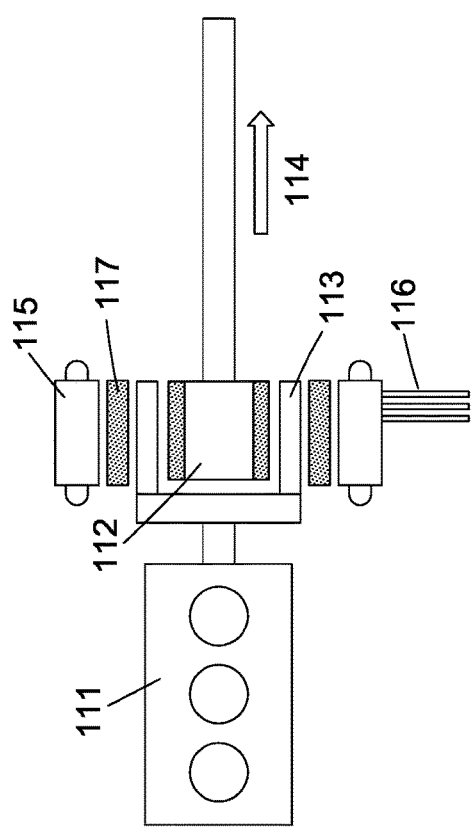

FIG. 11 show two possible arrangements of this embodiment of magnetic power split in a hybrid vehicle power train. The IC engine 111 in connected to either the inner PM rotor 112 or the pole-piece rotor 113, while the other is connected to the final drive 114. The PM control rotor 117, which interacts with in each case with a stator winding 115 having an electrical power in/out 116, is not connected to either shaft (but is mechanically supported on bearings to allow it to freely rotate.

Embodiment 2

Two Rotor Device

Figure 12:
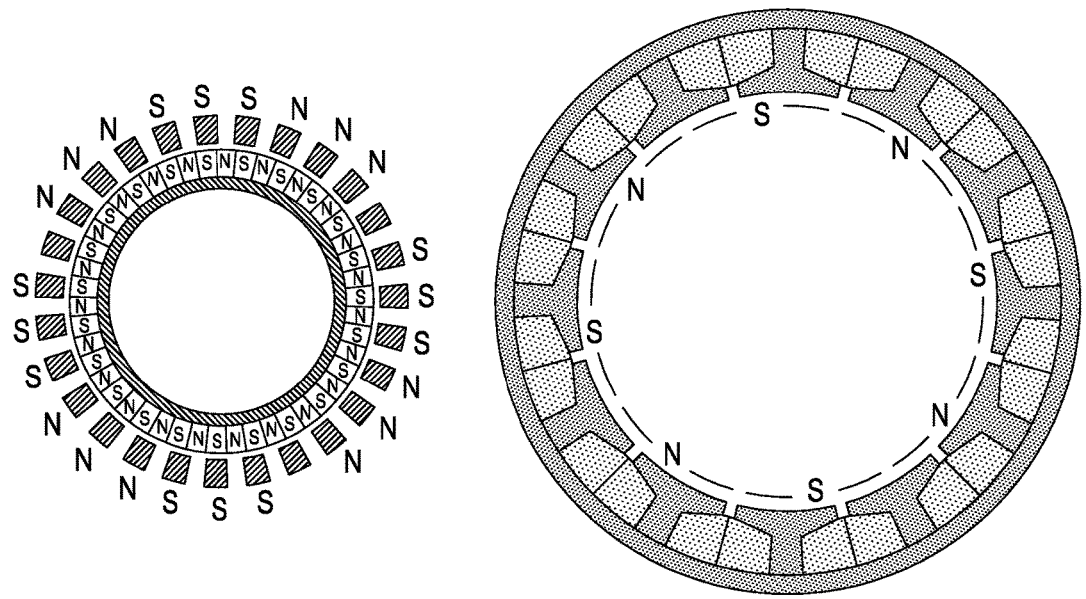
FIG. 12 contains an explanation showing how a stator producing a correct pole-pair number will couple with a consequent field produced by a PM array and modulating pole-piece rotor (e.g. 12 slot, 3-phase concentrated winding producing rotating 4 pole-pair pattern)

In this embodiment the control element is not a physical rotor, and is achieved through coupling of the consequent field with the field of the control stator. The power split element now consists of one permanent magnet array (typically the output rotor), and a modulating array of pole-pieces, usually the input rotor. The consequent field produced by the interaction the PM generated field with the pole pieces couples with a spatial field produced by a set of windings to produce torque and hence geared operation as shown in FIG. 12. If the currents in the winding are fixed the gear would operate with a fixed gear ratio. By supplying the windings which are spatially distributed, typically a three phase 120 degree displaced winding, with a temporally displaced current (typically a three phase, 120 degree displaced currents), the external field rotates. The gear ratio is then altered as explained above.

A possible way to explain this is to imagine the inner and outer arrays on eth control rotor above have the same pole number and are aligned. They then do not require back-iron to carry flux and this can be removed. We then gradually reduce the radial thickness of these arrays. They tend to zero and eventually disappear—but the consequent field has the same pole number and disposition as the field produced by the control stator and so will couple. Therefore the intermediate control rotor is not required.

Figure 13:
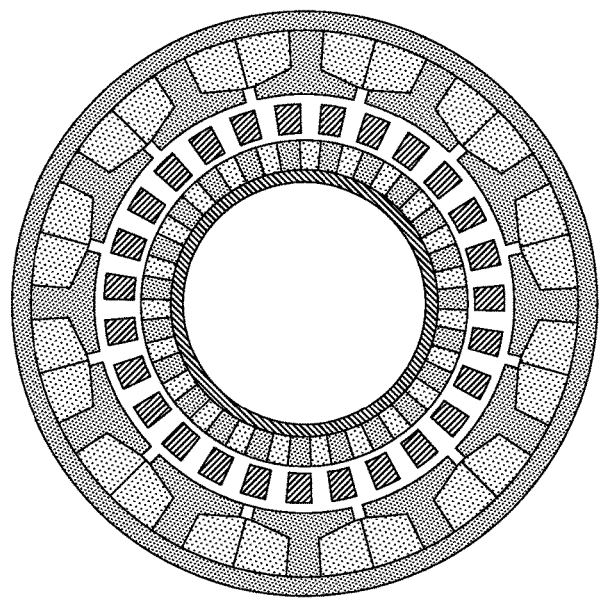
FIG. 13 shows combined gear components and stator to interact with a consequent field to create a two-rotor power split pole-pair pattern.
Figure 14:
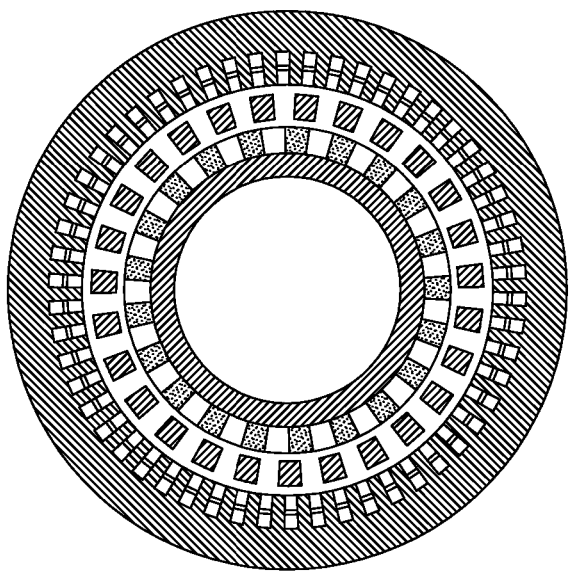
FIG. 14 shows a two-rotor variant with a distributed winding.
Figure 15:
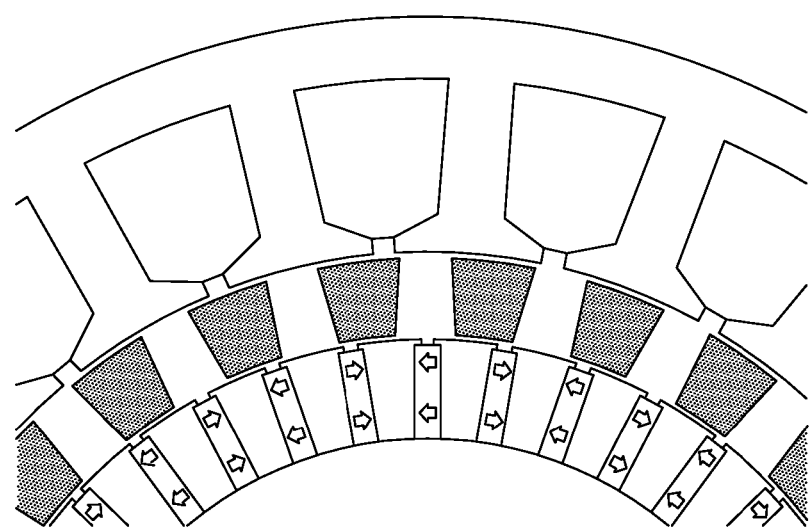
FIG. 15 shows a two-rotor system with a PM rotor having an interior permanent magnet array, with circumferentially aligned magnets and ferromagnetic poles to focus flux radially into the airgap.

The resulting two rotor device is shown in FIG. 13. Other variants of stator and PM rotor are also possible. For example, FIG. 14 shows a variant with a different stator with distributed windings as opposed to the concentrated windings shown in FIG. 13. FIG. 14 shows a variant where the inner PM rotor is a buried magnet/interior magnet design with circumferentially aligned magnets focusing flux into ferromagnetic poles which divert the flux radially into the airgap.

This embodiment has a number of distinct advantages beyond the previous case. For example:

- By eliminating the physical control rotor the control system has zero inertia and its response is determined by the much quicker electrical and magnetic time constants. This provides much high bandwidth of control and can improve drivetrain dynamics significantly.
- The torque capability of the gear is no longer fixed (as in the case above with two permanent magnet arrays) and torque is now proportional to current. In highly transient systems this allows the device size to be reduced as currents can be increased for short durations to deal with peak demands with the device thermally rated to deal with a lower mean torque requirement.
- The removal of the physical control rotor which is typically a high speed rotor eliminates its associated bearings, losses and reduces noise (through removal of a large physical rotating element).
- There is a significant reduction in the volume/mass and hence cost of permanent magnet material.

Figure 16:
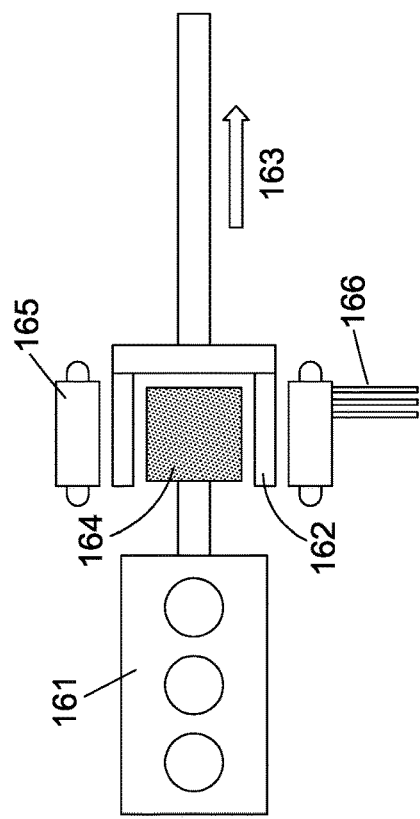
FIG. 16 shows a power-split hybrid system with a two rotor system.
Figure 16:
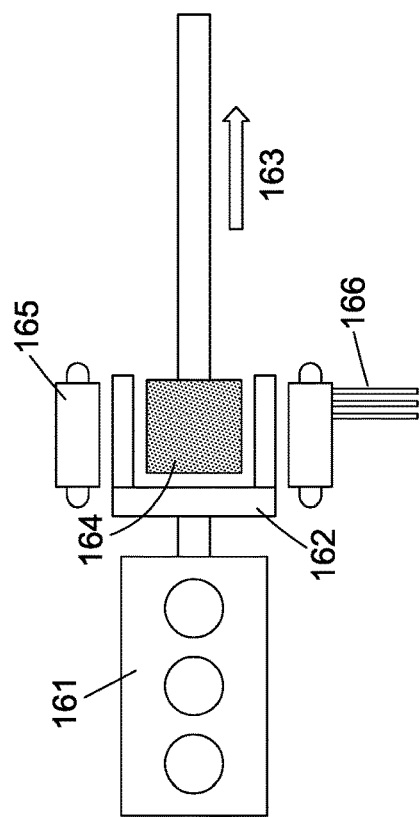

FIG. 16 shows two possible arrangement of the two rotor system in a hybrid vehicle power train. In a first arrangement, the ICE 161 is coupled to the pole piece rotor 162, the final drive 163 is coupled to the inner PM rotor 164 and a winding is provided on a control stator 165 that is connected to electrical power in/out 166. In a second arrangement, the ICE 161 is coupled to the inner PM rotor 164, the final drive 163 is coupled to the pole piece rotor 162, and the control stator 165 and winding are unchanged.

Magnetic Clear Characteristics Allowing for Flywheel-Less Transmission

In each of the two main groups of embodiments described above, the magnetic gear introduces a degree of compliance into the drivetrain. In this respect the magnetic powersplit can be used to replace the functionality of both the power-split hybrid architecture and DMF and hence the DMF can be deleted from the system. This can be achieved in two ways, passively using the torsional compliance of the gear alone or additionally actively controlling the gear as discussed below.

Passive Cancellation Through the Magnetic Clear Compliance

The coupling of rotors within the magnetic gear system is achieved through magnetic fields. This introduces a degree of torsional compliance into the system which is akin to the coupling of a dual mass flywheel (DMF) in which inertias are coupled together through mechanical springs and dampers. Introducing a magnetic gear within a transmission can replace the requirement to have a DMF, and allows for a single degree of freedom tuning system to eliminate a range of frequencies from the drivetrain torque allowing a reduction in torque pulsations. As stated previously, to some extent the inertias are decoupled from the required gear ratio and the inertias can be tuned to achieve a required band of frequency attenuation. This can be considered as a passive system. The stiffness of the system is dictated by the pole-numbers within the magnetic gear, whilst the diameters can be chosen to achieve a given mass. Inherent damping is included through the electromagnetic losses in the system (eddy current losses in magnets, losses in windings etc) but this can be enhanced if necessary with the inclusion of damper winding or damper bars (which are conductive elements often short circuited that have currents induced within them due to changing fluxes from any asynchronous fields which occur during transient rotor oscillations.

By introducing a DMF function through the magnetic gear, any additional flywheel inertias may then be reduced, which allows for rapid vehicle transients while still maintaining a smooth engine output and reduction in NVH.

Although the above feature can be used to eliminate the DMF (with cost and simplification benefits), it is also possible that the system is used in conjunction with a DMF to realise a two degree of freedom (2-DOF) system, which is able to attenuate a wider band of frequencies (which may be employed in luxury class of vehicles for example).

A further advantage of employing a magnetic gear is that it introduces a torque limit. If any loads apply exceed the torque carrying capability of the airgap shear stress developed by the magnetic fields, the rotors disengage and harmlessly pole-slip. The gear will automatically re-engage once the overload torques have passed. This "torque fuse" operation can protect the engine and drivetrain mechanical system from sudden/rapid destructive transients in the drive train, during extreme shock load events such as kerb strikes.

Figure 17:
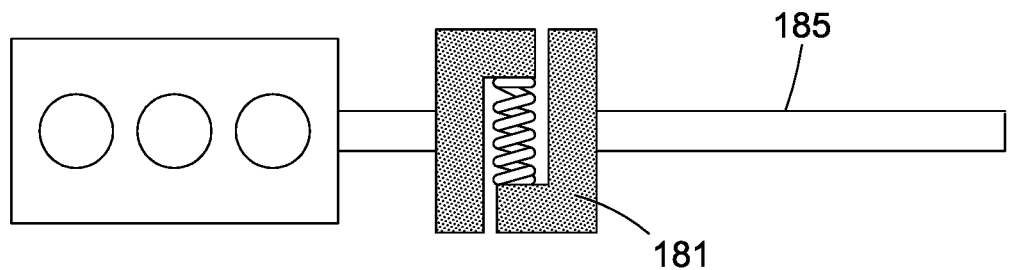
FIG. 17 shows a conventional engine NVH reduction with a DMF.
Figure 18:
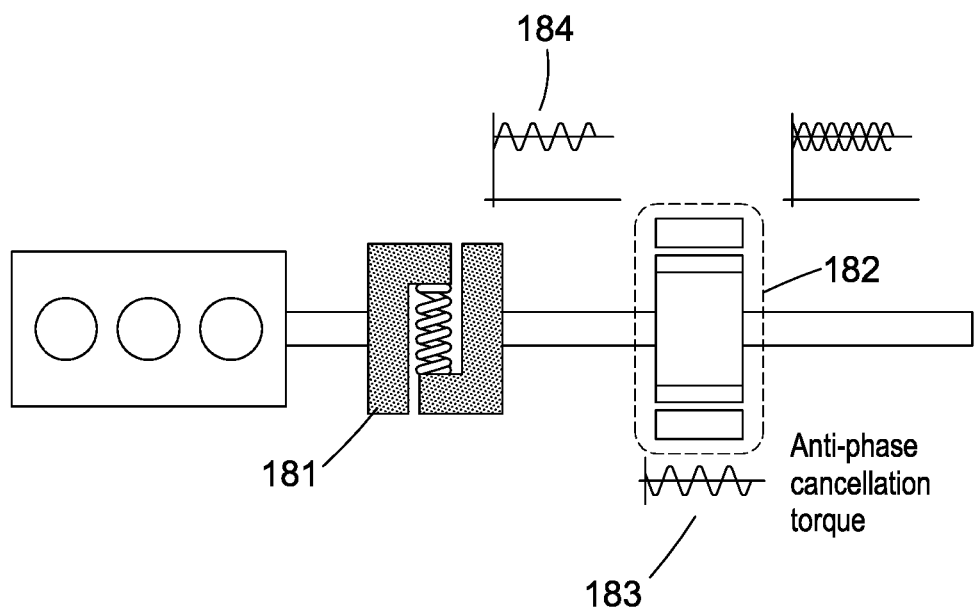
FIG. 18 shows a DMF with an additional active torsional vibration cancellation/damping device.

Active Cancellation Through Control of Magnetic Power Split Currents and Torques With reference to FIGS. 17 and 18, the present inventors have realised that the attenuation capabilities and hence NVH of a conventional powertrain, employing a DMF 181 could be significantly enhanced by introducing an electrical control element in the form of a suitable magnetic power split 182 into the transmission 185 which can actively apply cancellation torques 183 by actively controlling currents (in anti-phase to the torque pulsations) to reduce or filter out torque pulsations 184, as shown in FIG. 18.

Figure 19:
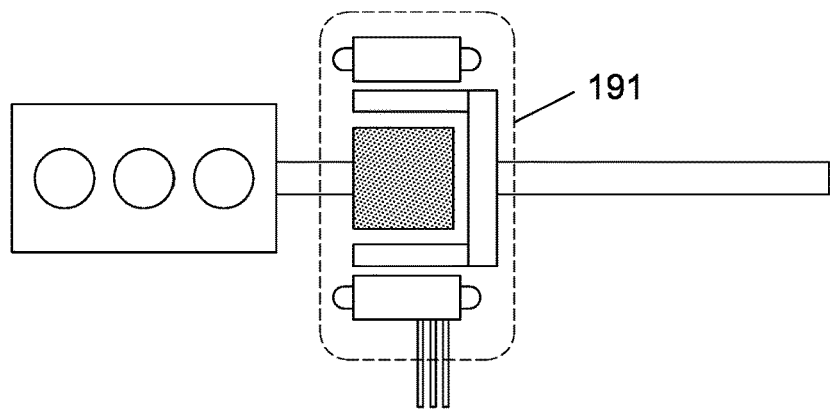
FIG. 19 shows a Magnetic power-split incorporating DMF functions with a simplified architecture.

The primary torque transmission in both the 2 and 3 rotor systems is achieved by developing a reaction torque on the control element. By controlling the currents in either system the function of an active torsional vibration/oscillation cancellation system can be obtained using the magnetic powersplit 191 as shown in FIG. 19.

For the case of the 3 rotor system the control element is the control rotor which provides a rotating magnetic field into the magnetic gear system by virtue of the permanent magnet poles on the rotating element. The torque is developed by providing a "load angle" between the magnetic poles which is realised by a relative electrical position between rotors and their corresponding rotating magnetic fields. This implies that the load in the magnetic gear and the torque transmitted through the 3 rotor system can be entirely controlled by changing the load angle in the system which may be achieved by momentarily accelerating or decelerating the control rotor. In this manner the transient energy is stored and returned from the energy storage system and is not simply dissipated to cause loss. However, the VA rating of the inverter has to accommodate this peak power and there are associated conversion losses.

The 2 rotor system differs slightly inasmuch as the control element is the rotating magnetic field generated by the sequential current flow in the phase-displaced windings in the stator. In this case the load angle is always maintained at 90 degrees to give the maximum torque per amp in the stator and achieved the highest efficiency (this control method is analogous to the control of a synchronous machine where the stator field is synchronised to the consequent magnetic field). In this case the primary torque transmitted through the magnetic gear is controlled by modulating the amplitude of the current in the stator windings (again analogous to the control of synchronous machines). This provides further ability to isolate the torque and speed oscillation/pulsations from the engine (or other prime source). For example, if the input rotor has a high level of vibration and torque oscillation the controller can be required to maintain a constant unchanging current magnitude. This implies that the torque transmitted to the output rotor (i.e. the vehicle drive train) will also be constant and the vibration will manifest itself as a speed oscillation of the input rotor (crankshaft and flywheel). The amplitude of the speed variation will be a function of the inertia but the vibration will not be transmitted to the output shaft.

This has a secondary advantage where, unlike other active electromagnetic vibration control systems that provide a reaction torque via a motor/generator system working in anti-phase which generate losses in response to the control action the 2 rotor system will not induce electrical losses or require an increase in rating of drive VA to provide vibration attenuation.

The two-rotor system therefore has significant advantages including:
1. The system has a very high bandwidth as the response is governed by the electrical and magnetic systems only which can have time constants an order of magnitude lower than the mechanical system and does not have to accelerate/decelerate a mechanical inertia.
2. The system provides true attenuation in that the stator will not provide a reaction torque for pulsations at a certain frequency and therefore the pulsations cannot manifest themselves in the powertrain in the first instance which would then have to be attenuated by this or secondary systems (as opposed to a vibration cancellation system).

Control Systems for Active Cancellation

Operation of systems described above in order to provide "active" cancellation will now be described.

The undesirable engine torque pulsations accelerate the crank shaft forward, which would reflect a torque through the entire drivetrain system if the shafts were rigidly or compliantly coupled (the amount that is let through depends on the compliance). However, the proposed active cancellation system addresses this in one of two ways depending on the magnetic power split used.

In the three rotor system, the control rotor that is not connected directly to the drive train is accelerated forward in response to a potential acceleration of the drive shafts through the interaction of the control rotor with the stator winding currents. This does not allow a load to develop in the magnetic gear and hence the crankshaft acceleration is not transmitted to the drive shaft. The third control rotor experiences the consequent acceleration rather than the drivetrain and hence it is advantageous that this has low inertia (such that it can be rapidly accelerated in response to engine pulsations). The controller demands current and hence torque to accelerate the control rotor potentially in response to an error signal generated when shaft speeds increase above an expected steady state torque.

The control system for the two-rotor system differs from above. In a normal speed controlled motor drive system a speed error (caused by an acceleration of the crankshaft input) would lead to a speed error, and hence a speed controller response and hence a torque response to limit the speed error. This is analogous to coupling the shafts together and limiting the differential speed between them. This also causes losses and hence a reduction in efficiency. In the two-rotor rotor system the proposed control would actively ignore the torque pulsations, and allow an acceleration of the consequent magnetic field and not control it i.e. it would not increase the magnitude of the torque in response to the speed error. As there is zero inertia, the torque is not reflected anywhere else in the system.

For either system, the input controller acts to control vibration by responding to slight position/velocity/accelerations detected on the drive shafts. This could be improved by using pre-knowledge of the incoming vibration (for example the crankshaft oscillation caused by pulsating piston torque can be largely determined using knowledge of the geometry and combustion parameters of the engine). Using model predictive control, the controller then applies the required action in a pre-emptive fashion rather than responding to an error signal. Crankshaft oscillations are a function of cylinder pressure acting on the piston, the piston imparts torque onto the crank shaft and is a predictable cycle depending on engine load and speed and can be mapped/or stored as a look-up table. Therefore, any controller can have prior knowledge of incoming loads based on driver inputs and/or vehicle performance. In the 3-rotor system, this knowledge can be employed so that the controller is not waiting for a speed error to develop, and instead pre-accelerates the rotor to overcome the system response/time constant i.e. time for torque to develop in response to a demanded increase due to inductance limiting rate of rise of current etc. In the 2-rotor system, as stated above the controller differs in that it is effectively ignoring disturbances in the system to maintain a constant torque. However, the system has to respond to required/demanded acceleration and must differentiate these from the undesirable torque pulsations.

For example, for the three-rotor system, it is envisaged that control means in the form of an electronic control unit of the drivetrain may carry out the following steps:

(a) Receiving a first signal indicative of the rotational speed, rotational position and also the torque of the crankshaft. The torque may be estimated from the throttle position to give an average torque. The pulsation torque may then be derived from this and from consulting a look-up table.

(b) Receiving a second signal indicative of a desired speed of the output from the magnetic gear to, for example, the differential of the vehicle.

(c) Based on the inputs in step (a), identifying a target current to be established in the windings. The target current comprises a cyclically varying correction current to accelerate and decelerate the control rotor to at least reduce the transmission of cyclic variation in the speed and torque of the crankshaft. This step may include consulting a look-up table of the relationships between the inputs sensed in step (a), the desired speed of the output member, and the current in the windings that corresponds to these quantities.

(d) Controlling the current in the windings to be substantially as the target current. This target current is maintained as long as the conditions remain in steady state.

In the two rotor system, and again for example, it is envisaged that control means in the form of an electronic control unit of the drivetrain may carry out the following steps:

(a) Receiving a first signal indicative of the rotational speed of the crank shaft.

(b) Receiving a second signal indicative of a desired speed of the output from the magnetic gear to, for example, the differential of the vehicle.

(c) Based on the first signal and the second signal, identifying a value for the current in the windings to give the desired speed of the output member. In this embodiment, the value comprises the frequency of the current (for speed control) and the magnitude of the current (for torque control).

(d) controlling the current in the windings to be substantially constantly at that the value, irrespective of cyclic variation in the speed and torque of the crank shaft. The current is controlled to be substantially constant irrespective of cyclic variation in the speed and torque of the crank shaft due to individual combustion events in an internal combustion engine of which the crank shaft is part. The current is kept substantially constant for as long as the first signal and the second signal are substantially constant. It will be appreciated that the current is AC and so keeping the current "constant" should be interpreted accordingly.

The method may also comprise receiving a signal indicative of the torque of the input member. This torque may also be used in step (c) as the basis for identifying the current. Step (c) may again include consulting a look up table of the relevant relationships.

Cantilevered Open Cup Structure

Figure 20:
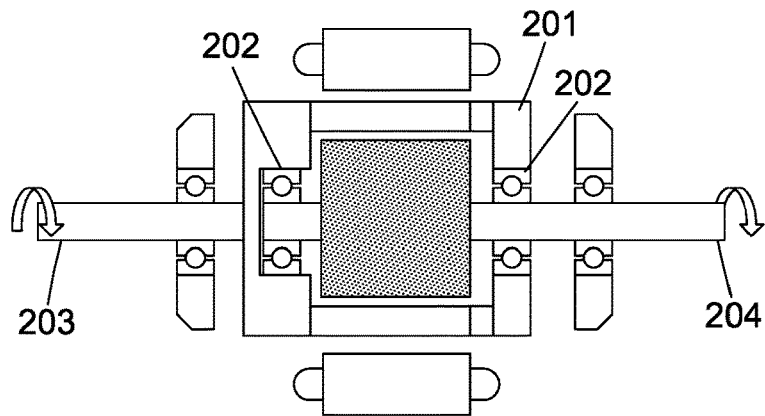
FIG. 20 shows a full bearing system with a pole-piece rotor fully supported.
Figure 21:
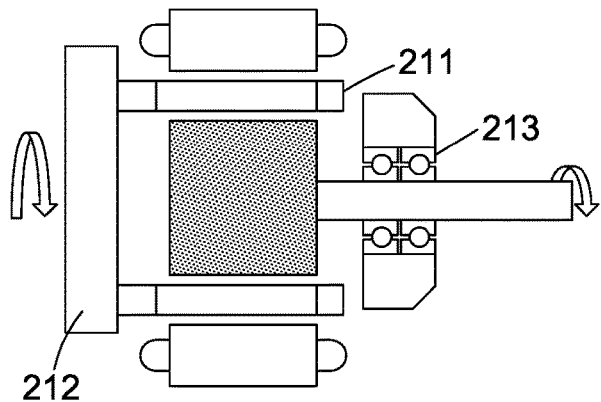
FIG. 21 shows a cantilevered, open-cup rotor structure.

It is apparent that vibration control and attenuation is highly linked to the rotational inertias in the system and the ability to tune this inertia upwards and downwards can offer a range of design benefits. For example:

Increased engine transient response
Reduced flywheel requirements
Higher bandwidth active cancellation
Lower vibrational energy In the magnetic gear system the diameters of the components are not linked to the gear ratio and hence the inertia is not dictated by the gear ratio. This advantage can be enhanced by the use of low inertia rotating components. One method of achieving this is to use a cantilevered open-cup structure 211 where the rotating elements are each only supported at one side as shown in FIG. 21 as opposed to a more traditional approach as shown in FIG. 20. In FIG. 21, the pole piece rotor is fixed directly to the ICE crank output or flywheel 212 and uses the engine bearings for support. The inner PM rotor is also cantilevered with the shaft therefrom supported by bearings 213. In FIG. 20, the pole piece rotor is a closed-cup structure 201 supported at each side by respective bearings 202 around the input shaft 203 and output shaft 204. This also has the added benefit of reducing the sub-assembly cost by virtue of the reduced part-count, simplifying assembly and increasing system efficiency by removing a bearing and element that may have magnetic losses induced in them due to asynchronous leakage fields.

Figure 22:
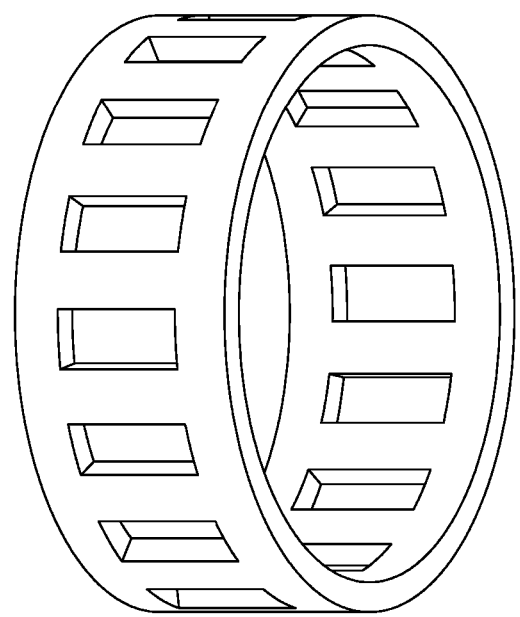
FIG. 22 shows a pole-piece rotor cage (either pre-moulded or showing overmoulded material)
Figure 23:
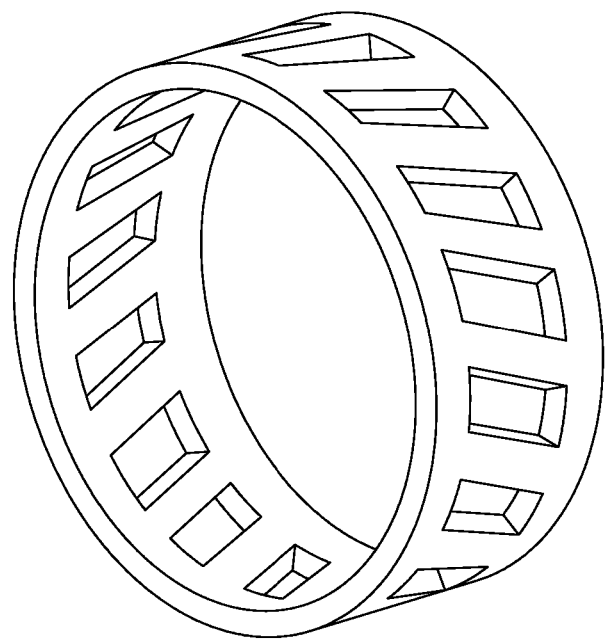
FIG. 23 shows a pre-twisted pole-piece rotor cage.

This open cup technique can be also used to tailor the torsional characteristics of the gear to further degrees of design freedom to enhance vibration attenuation and performance over a range of loads. FIG. 22 shows a possible pole-piece rotor frame structure for holding the laminated pole-pieces. This structure must be non-magnetic to allow correct modulation by the pole-pieced and is preferably non-metallic to prevent eddy currents or "cage" currents which would lead to losses and reduced efficiency. It is typically manufactured from an engineering plastic or composite material. It may be machined or preferably moulded from a composite material for example by Resin Transfer Moulding as discussed above. The support structure may be pre-formed and pole-pieces inserted and held afterwards or the pole-pieces may be over-moulded into the structure. By manufacturing the pole-piece rotor support structure from suitable materials with particular modulus of elasticity, the pole piece rotor can allow a degree of twist as it is loaded (the load torque applied causing a torsional deformation which is progressive along the length away from the fixed end. This adds an additional compliance into the system providing a further degree to allow attenuation of torsional oscillations from manifesting on the drive train. The materials may be selected for their damping properties to again reduce torque oscillations. It is also possible to include a degree of reverse skew (when unloaded) as shown in FIG. 23 and allow load torque to untwist increasing torque capability (rather than diminish) as the pole-pieces are forced into correct position to maximise the magnetic modulation.

Powering Ancillary Drives

As well as providing tractive power, the internal combustion engines (e.g. reciprocating Diesel/Petrol engines) used in passenger, commercial and off-highway vehicles also power a number of ancillary drives often through an accessory belt. Many of these ancillaries provide essential support functions for the engine such as lubricant oil pumps, water coolant pump, and electrical alternator, and other vehicle functions e.g. power steering systems as well systems. He engine also powers systems for passenger comfort. Key to these is the Heating, Ventilation and Air Conditioning unit (HVAC) which requires a coolant compressor.

All these accessories are typically driven by an accessory/ancillary belt, driven by the engine. Each ancillary drive is connected via the same belt, all the ancillaries speeds have a fixed relationship between engine crank rpm (the fixed speed ratio being determined by the ratio of pulley wheel diameters.

This fixed relationship can be problematic when the load demand of the ancillary does not match the instantaneous engine operating point.

For example, occasionally there may be a deficit between engine output and load demand. This is particularly onerous for the HVAC system, when the comfort load demands maybe very high (e.g. for passenger comfort when stationary in traffic) while the engine is idling.

There are also potential issues when the output exceeds demand, leading to energy wastage. For instance, if hydraulic or fluid pressure is not required from a compressor or pump, the working fluid may be recirculated. Engine power is then being dissipated needlessly reducing system efficiency, increasing fuel consumption and emissions.

This mismatch of requirements is further exacerbated in modern hybrid vehicle applications where the engine can frequently stop/start to conserve fuel under certain driving conditions. It is desirable to maintain (at least some) ancillary function when the vehicle is occupied even when the engine has stopped, examples of which include Heating, Ventilation and Air Conditioning and component cooling pumps to items that may remain active and hot when the engine has stopped. This is particularly advantageous during periods of so-called hot-shut down which leads to a high degree of heat soak from one component to another as the engine and coolant are stopped, where this heat soak can lead to component temperatures exceeding their in-use values. Furthermore the maintenance of oil pressure and flow via the oil pump can be advantageous to turbocharger systems using oil filled hydrodynamic bearings where the turbocharger can remain at high speeds at engine stop and the loss of oil supply can lead to touch-down of the bearings and premature wear of the surfaces. Typically turbocharger bearing journals have high wear resistant materials such as cobalt to limit damage under these conditions.

One solution disclosed in the present disclosure is to use one of the systems described above to drive one or more of these ancillary components. It is envisaged that any of the power split systems and devices described above may be used, with the engine coupled as the mechanical input to the system and the ancillary component, such as the compressor for the HVAC, coupled as the mechanical output in substitution for the final drive in those earlier examples. By operating such a system according to the methods disclosed herein and described above, it is possible to decouple the speed of the ancillary component from the engine/belt. This addresses the problems noted.

Figure 24:
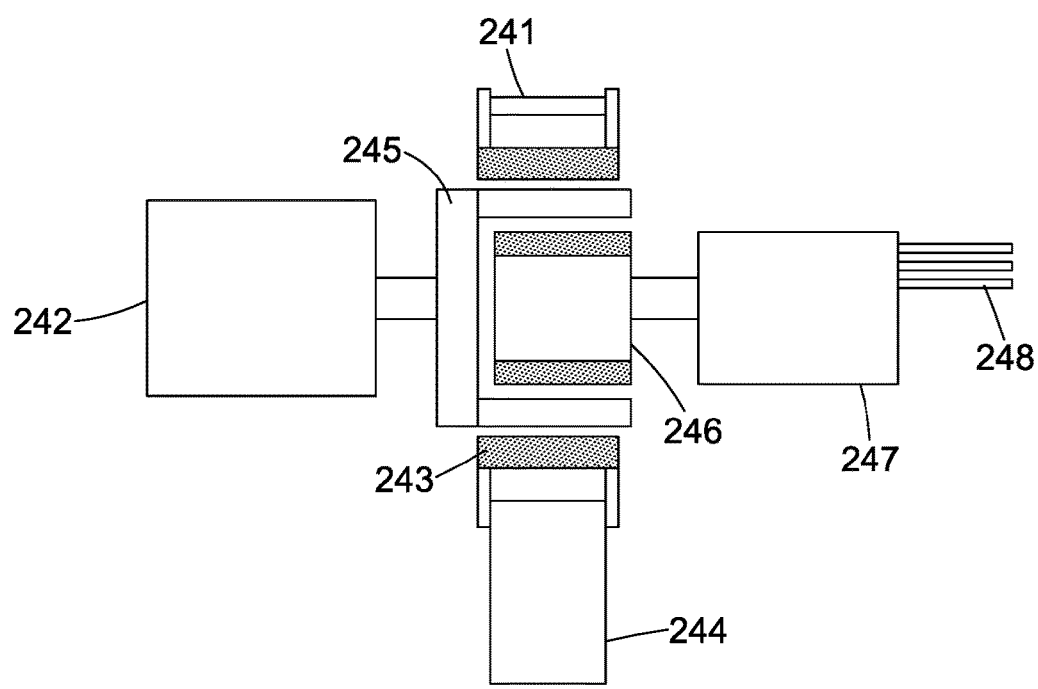
FIG. 24 shows a variable gear with a belt input to an outer rotor.

In one arrangement shown in FIG. 24, a pulley 241 is arranged to be driven by a belt (not shown) driven by the ICE. The pulley 241 is mounted concentrically about the outer PM rotor 243 and, therefore, the driving belt 244 is aligned with the magnetic gear along the axis of rotation. The HVAC compressor 242 is coupled to the pole piece rotor 245. The inner PM rotor 246 acts as the control rotor and is coupled to an electrical machine 247 connected to electrical power in/out 248 in the manner that will by now be understood.

This embodiment has advantages of not requiring any through shafts which can lead to significantly improved assembly procedures and serviceability.

In this case there is a direct mechanical equivalent system inasmuch as the high speed rotor remains at the centre of the magnetic gear (similar to the mechanical analogy). However, it should be noted that there is significantly more flexibility in achievable gear ratios in a magnetic gear over their mechanical counterparts. Again this is as they are not dependent on specific tooth pitch (in a mechanical gear all the teeth must mesh and determined by number of teeth and hence gear size) and the individual teeth must be prevented from clashing as they mesh which limits the ratio that can be achieved. For example the gear ratios between an inner PM rotor and outer PM rotor from 1.01:1 up to 15:1 may be achieved. Similarly, for an inverted gear the ratio between the high torque PM rotor and pole-pieces may be above 0.7 whereas the limit in an equivalent mechanical gear is 0.25 to 0.67 although practical limitations limit this to between 0.3 and 0.5, or about 0.4. This increased freedom in choice of quiescent gear ratio can allow improvements over any mechanical equivalent, for example by selecting a higher gear ratio the energy transferred via the direct path through the gear may be maximised over a given duty cycle and this in turn minimises the amount of energy transferred through the electrical system which suffers conversion losses.

Whilst the advantages of being able to select a gear ratio from a much broader range are apparent the ability to invert the gear leads to further benefits since providing the external control field to interact with the consequent field and providing a method to control its rotation can be achieved in a more integrated way, as discussed above.

In an alternative arrangement, the magnetic powersplit devices described above may be arranged between an engine and a belt drive. That is, the input of the magnetic powersplit may be connected to an internal combustion engine variable speed prime mover, and the output connected to a pulley for driving a belt. The belt which is driven by the output of the magnetic powersplit may then be used to drive ancillaries in the conventional way.

Figure 25A:
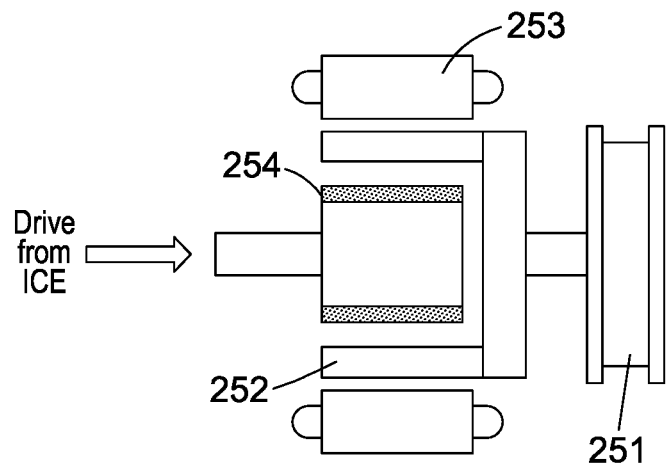
FIG. 25 shows a variable gear with an engine input delivering controlled speed output to an ancillary belt, with FIG. 25a showing an inline pulley wheel and 25b showing a concentric pulley wheel.
Figure 25B:
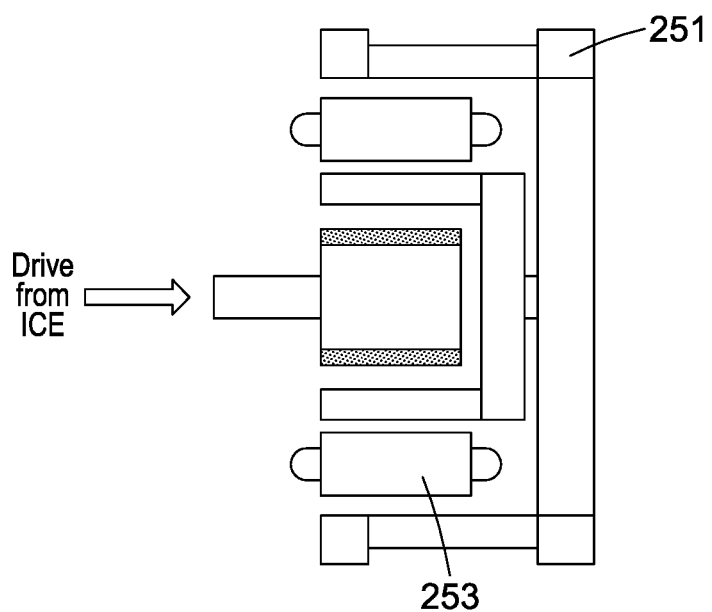

FIG. 25 shows the engine input to the variable ratio gear (in this case on the magnetic rotor shaft) which is then used to control the speed of the output rotor which is itself connected to the pulley and belt. This eliminates all speed variations at source and can be used to supply several ancillaries which are mounted on the belt system. FIG. 25a shows such an arrangement with an inline pulley wheel 251 coaxially coupled to the pole piece rotor 252. The pulley wheel 251 drives the ancillary belt. The ICE is coupled to drive the inner PM rotor 254. A control stator 253 is provided with a winding as will by now be understood. In FIG. 25b, the pulley wheel 251 is concentric with the other components and is arranged radially outside the control stator 253.

Figure 26:
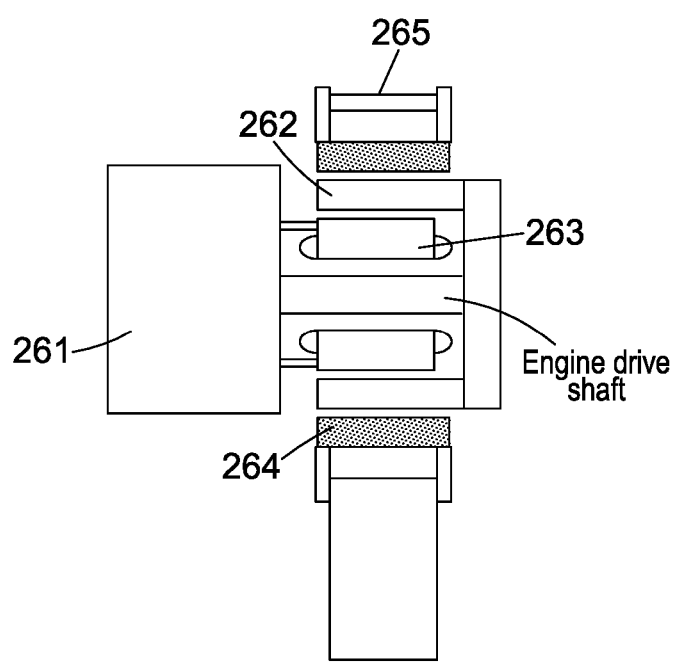
FIG. 26 shows an example of variable gear with an engine input delivering controlled speed output to ancillary belt with an internal stator.

A further arrangement exists where an internal stator can be used to simplify the mechanical construction of the system as shown in FIG. 26. In this arrangement, the ICE 261 is coupled to drive the pole piece rotor 262, with a control stator 263 provided radially inside the pole piece rotor and carrying a winding. The outer PM rotor 264 is coupled to the inner surface of a pulley wheel 265 that drives the drive belt for ancillary components.

Each of these arrangements has equivalent arrangements with 3 rotor systems described.

In an alternative mode of operation, the variable speed magnetic gears of any of the arrangements in which they are used to drive ancillary components can be used to provide starting and/or assisting torque for the engine. The motor/generator is used to provide motive power to turn the engine either from standstill (for starting) or to provide additional torque output to the drive train. In this case the output of the variable gear (which is connected to the ancillaries) must be prevented from rotating (for starting) or accelerating (for torque assist) by application of braking torque. This allows the torque to be transferred from the control motor to the engine crank (which is connected onto the input shaft of the variable gear) without causing rotation (or acceleration) of the ancillary components.

Suitable braking means include an electromechanical brake, such as a particle brake, a hysteresis power brake or a multiple disk brake; an eddy current brake; or a friction brake.

For each of the systems for powering ancillary components described above, the pulley drive from the ICE will generate a significant amount of torsional vibration in the system by virtue of the fact that this is driven from the engine crankshaft, which itself is subject to torsional pulsations derived from the pistons and firing cycles of the engine. If left unchecked this torsional vibration can cause significant damage to belt driven ancillaries and lead to a reduced lifetime. This is often addressed by using a so-called belt tensioner or other attenuation device (which may include a Torsional vibration damper mounted within the crankshaft pulley). The intrinsic torsional spring that is inherent in a rotary magnetic gear based system can be used to attenuate this vibration and hence delete the torsional vibration damper or reduce the requirements of the tensioner device and protect the ancillary.

The invention claimed is:

1. A system comprising an input member, an output member, a magnetic gear connecting the input member to the output member and control means arranged to control the flow of power from the input member to the output member wherein the magnetic gear comprises:
    a first set of magnetic poles associated with a first moveable element, the first moveable element connected to one of the input member and the output member;
    a second set of magnetic poles produced by a set of windings mounted on a stator of the magnetic gear; and
    a set of pole pieces arranged to modulate a magnetic field between the first set of magnetic poles and the second set of magnetic poles, the set of pole pieces associated with a second moveable element, the second moveable element connected to the other of the input member and the output member;
    wherein the control means comprises means for reducing transmission of torque pulsation and/or oscillation from the input member to the output member;
    wherein current in the windings is controllable by the control means; and wherein the control means is configured to:
(a) receive a first signal indicative of at least a speed of the input member;
(b) receive a second signal indicative of at least a desired speed of the output member;
(c) based on the first signal and the second signal, identify a value for the current in the windings to give the desired speed of the output member; and
(d) control the current in the windings to be substantially constantly at the value, irrespective of cyclic variation in the speed and torque of the input member.

2. A system according to claim 1, wherein the second set of magnetic poles is produced by a set of windings.

3. A system according to claim 2, wherein the windings are mounted on the stator.

4. A system according to claim 3, wherein the windings are controlled by the control means.

5. A system according to claim 1, wherein the second set of magnet poles is produced by a second set of permanent magnets.

6. A system according to claim 5, wherein the second set of permanent magnets is mounted on a third moveable element of the magnetic gear.

7. A system according to claim 6, wherein the control means is arranged to control movement of the third moveable element by operating the windings and the third moveable element as the stator and rotor, respectively, of a motor-generator.

8. A system according to claim 1, wherein the system further comprises an energy storage system, wherein the control means is configured to control the flow of power from the input member to the energy storage system or from the energy storage system to the output member if a required power at the output member is different from a power at the input member.

9. A system according to claim 1, wherein the control means is configured to control the current to be substantially constant irrespective of cyclic variation in the speed and torque of the input member due to individual combustion events in an internal combustion engine to which the input member is coupled.

10. A system according to claim 1, wherein the control means being configured to (d) control the current in the windings to be substantially constantly at the value, irrespective of cyclic variation in the speed and torque of the input member comprises keeping the current substantially constant for as long as the first signal and the second signal are substantially constant.

11. A system according to claim 1, wherein the control means is further configured to perform operations comprising:
receiving a signal indicative of the torque of the input member, and
using the torque in step (c) as the basis for identifying the current.

12. A system according to claim 1, wherein the set of pole pieces are arranged to modulate the magnetic field to reduce vibration caused by an internal combustion engine attached to the input member from transferring to the output member.

13. A system comprising:
an input member;
an output member;
a magnetic gear connecting the input member to the output member and arranged to control a flow of power from the input member to the output member, wherein the magnetic gear comprises:
a first set of magnetic poles associated with a first moveable element, the first moveable element connected to one of the input member and the output member;
a second set of magnetic poles produced by a set of windings mounted on a stator of the magnetic gear; and
a set of pole pieces arranged to modulate a magnetic field between the first set of magnetic poles and the second set of magnetic poles, the set of pole pieces associated with a second moveable element, the second moveable element connected to the other of the input member and the output member;
wherein the magnetic gear reduces transmission of torque pulsation and/or oscillation from the input member to the output member;
wherein current in the windings is controllable by the control means; and
wherein the control means is configured to:
(a) receive a first signal indicative of at least the speed of the input member;
(b) receive a second signal indicative of at least a desired speed of the output member;
(c) based on the first signal and the second signal, identify a value for the current in the windings to give the desired speed of the output member; and
(d) control the current in the windings to be substantially constantly at the value, irrespective of cyclic variation in the speed and torque of the input member.

14. A system as defined in claim 13, wherein the second set of magnet poles comprises a second set of permanent magnets mounted on a third moveable element of the magnetic gear, the third moveable element being a rotor of a motor-generator having a set of windings in which current is controllable, wherein the control means is further configured to perform operations comprising:
receiving a third signal indicative of a speed and a position of the input member;
identifying, based on the second signal and the third signal, a target current to be established in the set of windings, the target current comprising a cyclically varying correction current to accelerate and decelerate the third moveable element to at least reduce transmission of cyclic variation in speed and torque of the input member to the output member; and
controlling the current in the set of windings to be substantially constant at the target current.

15. A system as defined in claim 13, wherein the second set of magnet poles is produced by a second set of permanent magnets mounted on a third moveable element of the magnetic gear, and wherein the control means is configured to control movement of the third moveable element of the magnetic gear.

16. A method for controlling flow of power from an input member to an output member using a magnetic gear connecting the input member to the output member, wherein the magnetic gear comprises a first set of magnetic poles associated with a first moveable element, the first moveable element connected to one of the input member and the output member, a second set of magnetic poles produced by a set of windings mounted on a stator of the magnetic gear, and a set of pole pieces arranged to modulate a magnetic field between the first set of magnetic poles and the second set of magnetic poles, the set of pole pieces being associated with a second moveable element, the second moveable element connected to the other of the input member and the output member, wherein the magnetic gear reduces transmission of torque pulsation and/or oscillation from the input member to the output member, the method comprising, under control of control means:
  (a) receiving a first signal indicative of at least a speed of the input member;
  (b) receiving a second signal indicative of at least a desired speed of the output member;
  (c) based on the first signal and the second signal, identifying a value for a current in a set of windings to give the desired speed of the output member; and
  (d) controlling the current in the windings to be substantially constantly at the value, irrespective of cyclic variation in the speed and torque of the input member.

17. A method according to claim 16, further comprising controlling the current to be substantially constant irrespective of cyclic variation in the speed and torque of the input member due to individual combustion events in an internal combustion engine to which the input member is coupled.

18. A method according to claim 16, wherein (d) controlling the current in the windings to be substantially constantly at the value, irrespective of cyclic variation in the speed and torque of the input member comprises keeping the current substantially constant for as long as the first signal and the second signal are substantially constant.

19. A method according to claim 16, further comprising:
  receiving a signal indicative of the torque of the input member; and
  using the torque in step (c) as the basis for identifying the current.

20. A method as recited in claim 16, further comprising controlling flow of power from the input member to an energy storage system or from the energy storage system to the output member based on a required power at the output member being different from a power at the input member.

* * * * *